United States Patent [19]

Langley et al.

[11] Patent Number: 4,686,437
[45] Date of Patent: Aug. 11, 1987

[54] ELECTROMECHANICAL ENERGY CONVERSION SYSTEM

[75] Inventors: Lawrence W. Langley; H. Keith Kidd, both of Christiansburg, Va.

[73] Assignee: Kollmorgen Technologies Corporation, Dallas, Tex.

[21] Appl. No.: 909,031

[22] Filed: Sep. 17, 1986

Related U.S. Application Data

[63] Continuation of Ser. No. 625,190, Jun. 28, 1984, abandoned, which is a continuation of Ser. No. 161,579, Jun. 20, 1980, abandoned.

[51] Int. Cl.⁴ .......................................... H02K 29/00
[52] U.S. Cl. .................................. 318/254; 318/138
[58] Field of Search ................. 318/138, 254, 254 A, 318/696

[56] References Cited

U.S. PATENT DOCUMENTS

| | | | |
|---|---|---|---|
| 4,135,120 | 1/1979 | Hoshimi et al. | 318/254 |
| 4,169,990 | 10/1979 | Lerdman | 318/138 |
| 4,234,838 | 11/1980 | Langley et al. | 318/254 |
| 4,250,435 | 2/1981 | Alley et al. | 318/254 |
| 4,250,544 | 2/1981 | Alley | 318/254 |
| 4,258,299 | 3/1981 | Takeda et al. | 318/254 |
| 4,270,074 | 5/1981 | Duckworth | 318/138 |
| 4,278,921 | 7/1981 | Medding et al. | 318/254 |
| 4,303,781 | 12/1981 | Berry | 318/138 |
| 4,329,636 | 5/1982 | Uchida et al. | 318/254 X |

Primary Examiner—Benjamin Dobeck

[57] ABSTRACT

An electromechanical energy conversion system comprising a brushless motor and a stored program controller for controlling motor operation in a plurality of modes in accordance with internally generated and/or external commands.

14 Claims, 14 Drawing Figures

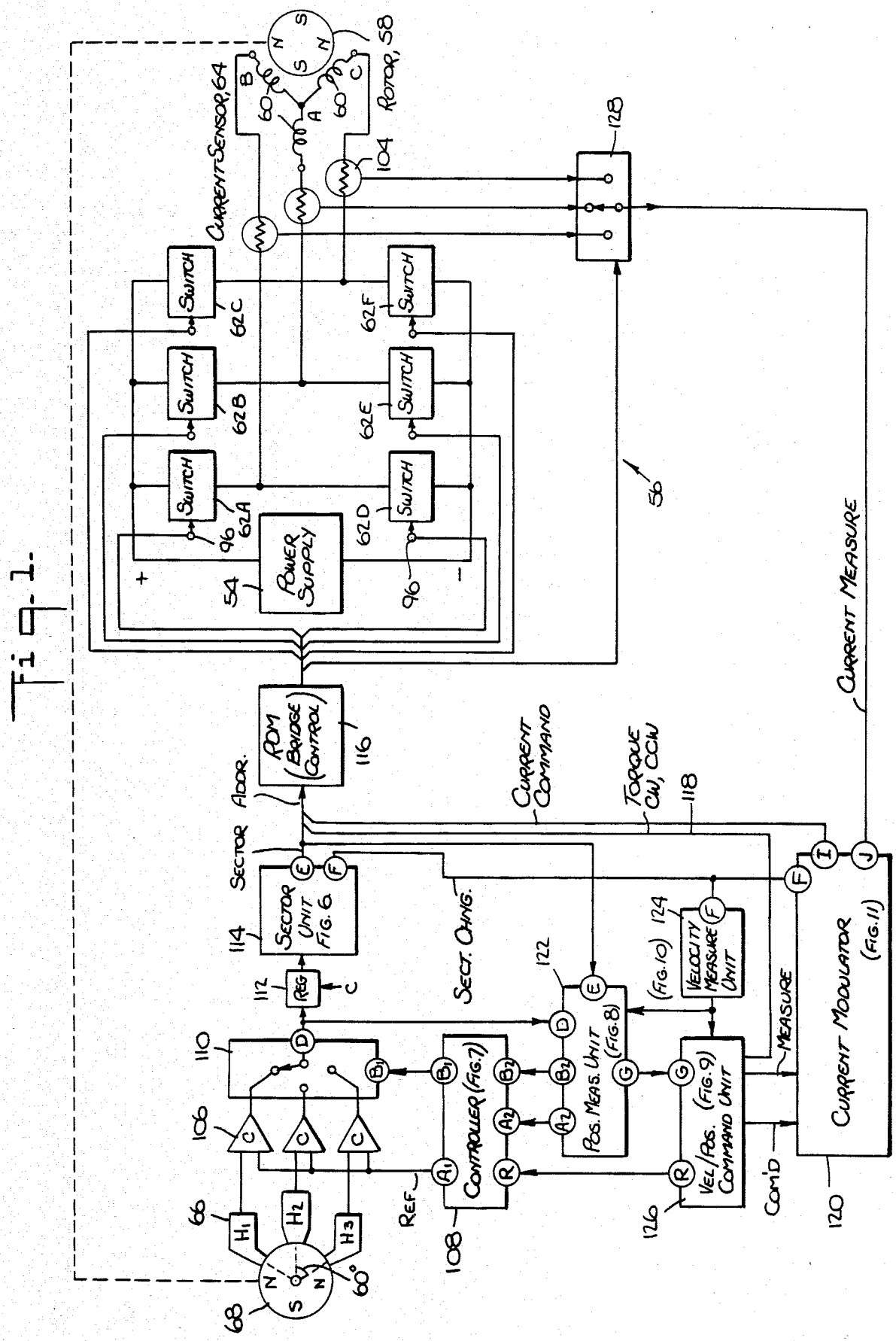

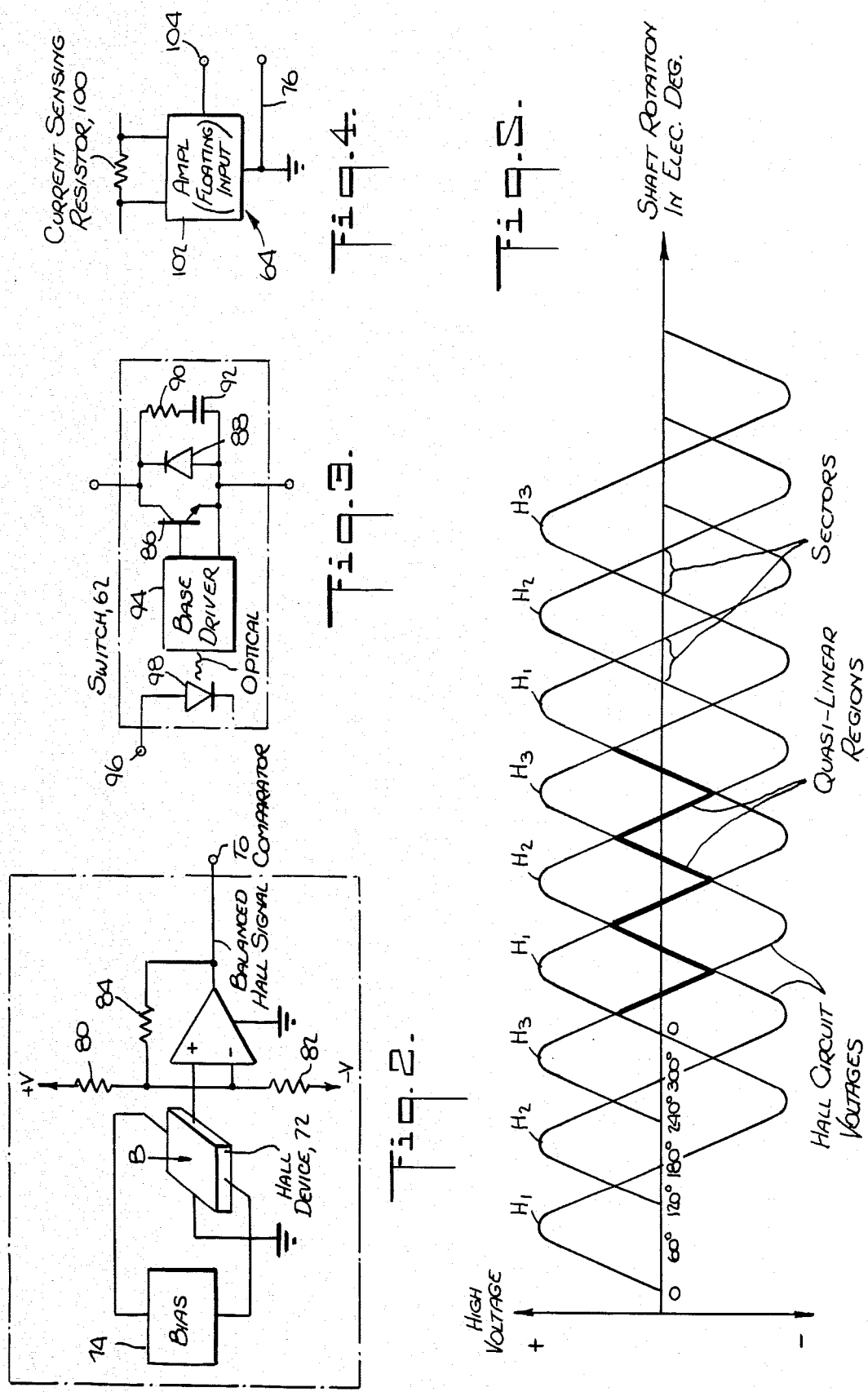

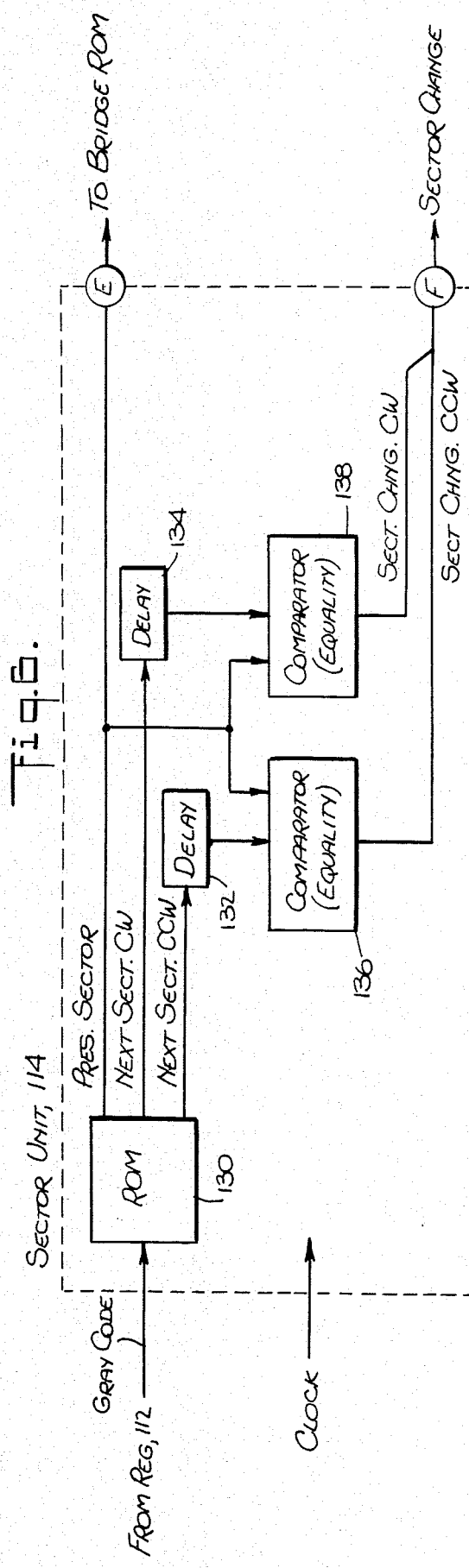

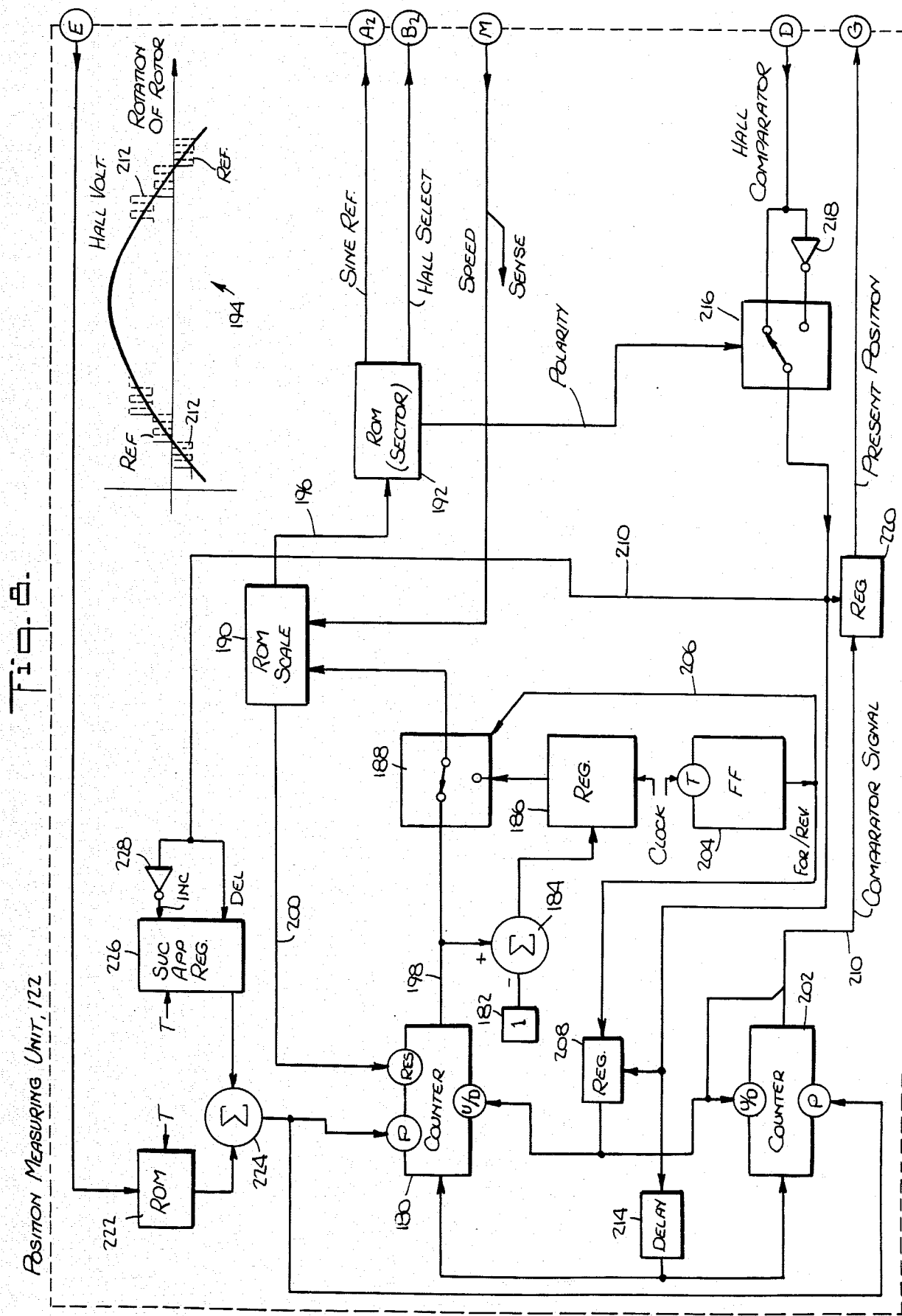

ELECTROMECHANICAL ENERGY CONVERSION SYSTEM

This is a continuation of copending application Ser. No. 625,190 filed June 28, 1984 now abandoned, which in turn is a continuation of copending application Ser. No. 161,579 filed 6/20/80 now abandoned.

BACKGROUND OF THE INVENTION

This invention relates generally to the control of electromechanical energy conversion and, more particularly, to brushless DC motors wherein commutation, speed, and/or position are controlled digitally.

Conventional DC motors employ sets of windings which are commutated during relative motion between the moving and stationary parts of the motor. This is true in both rotary and linear motors. Commutation may be accomplished either mechanically, by a commutator and brush assembly, or electronically, by means of solid state switching elements.

Commutation of the windings depends on the relative positions of the moving and stationary parts of the motor. In a brushless DC motor, comprising a rotor which rotates within a stator, the position of the rotor relative to the stator may be sensed optically or electromagnetically, for example by means of Hall effect sensors secured to the stator and positioned about a magnetized disc mounted on the rotor shaft.

Switching current in the motor windings may be accomplished by a bridge circuit. One such bridge circuit operated in conjunction with Hall sensors is shown in Malkiel U.S. Pat. No. 3,783,359 issued Jan. 1, 1974. The use of Hall sensors is also shown in Persson U.S. Pat. No. 4,086,519 issued Apr. 25, 1978. The bridge circuits normally use protective diodes with the transistors.

To avoid excessive power dissipation within the transistors, pulse width modulation of the current has been employed so that the transistors are either "ON" or "OFF". Pulse width modulation of a transistorized bridge switching circuit is disclosed in the aforementioned Malkiel patent.

Conventionally, the motor control circuit has been regarded as an entity separate from the motor itself, with separate control circuits being required to accomplish specific motor functions. In addition, separate motors have traditionally been employed to accomplish different functions. Thus, there are torque motors, servo motors, stepper motors, etc., each with its separate control circuitry. These practices, while conventional, are nonetheless expensive, inefficient and wasteful.

SUMMARY OF THE INVENTION

The aforementioned disadvantages are overcome and other advantages are provided by the electromechanical energy conversion system of the present invention. In accordance with the present invention there is provided a multi-mode energy conversion system employing a brushless electrical machine having field and wound members movable relative to each other, the wound member having a plurality of energizeable windings. The system further comprises sensors for sensing one or more parameters indicative of motor operation, such as velocity or position. Switching circuitry is connected to the windings for selectively energizing same. In addition, the system comprises a stored program controller, such as a microcomputer or microprocessor, which is connected to the sensors and the switching circuitry and produces command signals for controlling the switching circuitry in response to the signals produced by the sensors so as to enable the system to operate in at least two different modes. In addition, the system can respond to external commands and/or provide information to an external agency, such as a higher level control system.

The most preferred embodiment of the present invention employs a minimum of hardware to provide maximum versatility in function. The versatility is preferably provided by means of a stored program which permits the same or substantially the same hardware to operate in a number of different modes. Thus, the same or substantially the same hardware may be used for velocity tracking, position tracking, power transfer maximization and/or efficiency maximization. Moreover, the system may switch from one mode of operation to another as a function of signals provided from an external source or as a function of signals generated internally.

While the most preferred embodiment makes use of a stored program, the principles of the invention may also be practiced by means of hard wired circuitry or a combination of stored program and hard wired circuitry. For ease of understanding, the present invention will first be explained in terms of a series of modes of operation employing hard wired circuitry. Thereafter, the most preferred embodiment, including a stored program, is set forth.

One mode of operation is velocity tracking. A desired velocity and a measured velocity are compared and the result used to control winding current within predetermined limits. The winding current is measured and compared against upper and lower thresholds. The controller energizes windings when the measured value of the current reaches the lower threshold, and denergizes windings when the measured value of the current reaches the upper threshold.

Another mode of operation extracts the maximum power available from a source, such as a solar electric generator, wherein the output impedance of the source varies with temperature. The controller varies the duty cycle and, therefore, the average value of the current applied to the motor. As a result, the speed and power output of the motor vary, along with the apparent input impedance of the motor, so as to match the power input to the motor to the maximum that can be provided by the source. Specifically, the controller compares successive values of the measured velocity to sense an increment or decrement therein, the resulting increment or decrement being utilized to vary the duration of the pulses and, thereby, to adjust the apparent motor impedance and thus the motor output power.

A further mode of operation maximizes the efficiency of electromechanical power conversion. It has been found that maximum power is converted into useful work when the ratio of motor torque to current is at or near a maximum, this corresponding to the maximum value of the back electromotive force (EMF). Accordingly, the controller energizes windings only when back EMF is at or near a maximum.

A still further mode of operation is position tracking. A desired position and a measured position are compared and the result used to control winding current to reduce the position error. Again, winding current is compared with upper and lower threshholds and windings energized when the current reaches the lower

BRIEF DESCRIPTION OF THE DRAWINGS

The present invention will now be explained in connection with the accompanying drawings wherein:

FIG. 1 is a functional block diagram of an electromechanical energy conversion system in accordance with the invention;

FIG. 2 is a schematic diagram of a Hall sensor of FIG. 1;

FIG. 3 is a schematic diagram of a switch of the bridge circuit of FIG. 1;

FIG. 4 is a schematic diagram of a current sensing circuit of FIG. 1;

FIG. 5 is a graph of Hall sensor voltages produced by the Hall sensors of FIG. 1;

FIG. 6 is a functional block diagram of a sector unit of FIG. 1;

FIG. 8 is a functional block diagram of a position measuring unit of FIG. 1;

FIG. 11 is a block diagram of a current modulator of FIG. 1 for a velocity tracking mode of motor operation;

DETAILED DESCRIPTION

Figure 7:
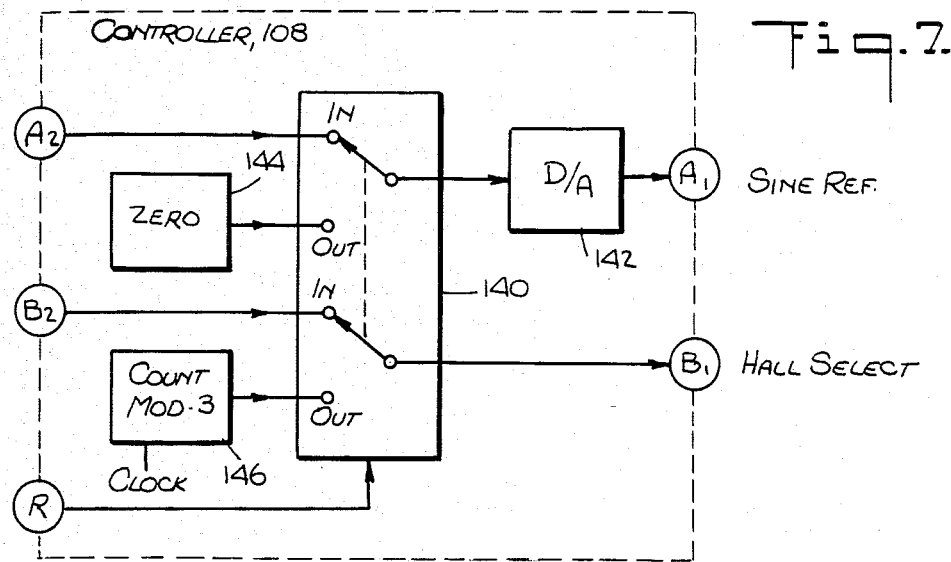
FIG. 7 is a schematic diagram of a controller of FIG. 1.

Referring now to FIG. 1, there is shown an electromechanical conversion system 50 comprising a DC motor 52 which is coupled to a source of power 54 by a bridge circuit 56. By way of example, motor 52 is a rotary DC brushless motor having a four pole, permanent magnet rotor 58 and a stator having three-phase, wye-connected windings 60. Bridge circuit 56 comprises six switches 62, arranged in pairs, one pair for each of the three windings 60. Between each pair of switches and each winding is a current sensor 64.

Three Hall sensors 66, further identified by the legends H1, H2 and H3, measure the relative position of the rotor and the stator. The Hall sensors are secured to the stator and are positioned about a magnetized disc 68 which is mechanically coupled (dashed line 70) to rotor 58.

Referring to FIG. 2, each Hall sensor 66 comprises a Hall effect device 72 upon which is impressed a DC bias voltage. The output of device 72 is coupled to the input of amplifier 78 which is biased by resistors 80 and 82. The magnetic field B of disc 68 passes through device 72 causing the output voltage thereof to vary sinusoidally. The Hall device output is linearly amplified by amplifier 78.

Referring to FIG. 3, each switch comprises a transistor 86 having a diode connected across the collector-emitter junction to provide a path for winding currents when transistor 86 is turned off. Resistor 90 and capacitor 92 filter transient currents. Base driver circuit 94 turns transistor 86 on and off and is optically coupled to control terminal 96 by a photodiode 98. Power for base driver circuit 94 is provided by a conventional supply (not shown).

Referring to FIG. 4, current sensor 64 comprises a current sensing resistor 100, having a low value, which provides a voltage drop, proportional to the winding current, which is amplified by amplifier 102. The polarity of the output of amplifier 102 reverses when the current flowing through resistor 100 reverses.

The three Hall sensors 66 are mechanically spaced apart 60 degrees along the periphery of the disc 68, which corresponds to a spacing of 120 electrical degrees in the graph of FIG. 5. The 60 degree mechanical spacing is equivalent to the 120 degree electrical spacing because of the four magnetic poles of disc 68. The waveforms in FIG. 5 repeat every 360 electrical degrees, which corresponds to 180 mechanical degrees of rotation. For an eight pole rotor the Hall waveforms would repeat every 90 degrees of mechanical rotation.

Commutation of the currents in windings 60 occurs once every 60 electrical degrees, which corresponds to a change of winding current with every 30 degrees of mechanical rotation of rotor 58. Disc 68 is oriented relative to the rotor 58 so as to provide commutation signals whenever a Hall voltage crosses zero, which occurs every 60 electrical degrees, thus defining 60 degree electrical sectors. In the case of a four pole motor, then, the entire commutation process is repeated twice during each revolution of rotor 58. As will be seen subsequently, the end of a sector is readily detected by comparing the Hall output voltage with a reference signal of zero volts. By using a non-zero reference other rotor positions can be determined. The sinusoidal traces H1–H3 in FIG. 5 are sufficiently linear in the vicinity of the horizontal axis so that the position of rotor 58 may be regarded as being proportional to the magnitude of the Hall voltage in that region. Also, as will be seen subsequently, it is possible to switch from one trace to another to obtain successive quasi-linear voltages indicative of rotor position.

Referring back to FIG. 1, system 50 includes comparators 106 which compare the Hall voltages with a reference signal obtained from terminal A1 of a controller 108 (described subsequently with reference to FIG. 7.) The outputs of comparators 106 are coupled by switch 110 to register 112 which stores the values of the comparator output voltages. Each comparator output voltage is either high (logic 1) or low (logic 0). A logic 1 exists when the Hall voltage is greater than the reference, while a logic 0 exists when the Hall voltage is less than the reference. Thus, the three comparator output signals stored in the register 112 constitute a three-bit digital signal in gray code which, as shown in FIG. 5, uniquely identify one of the six commutation sectors Sector unit 114 (described with reference to FIG. 6) converts the number in register 112 from gray code to a standard logic format. A sector identification signal appears at terminal E of sector unit 114, while a sector change signal appears at terminal F.

The operation of bridge circuit 56 is controlled by signals from a read-only memory (ROM) 116. ROM 116 is addressed by the sector identification signal at terminal E, a torque command signal on line 118 and current command signals from terminal I of current modulator 120 (described later). ROM 116 has sufficient storage for each permissible combination of signals for the six control terminals 96 of the six switches 62.

To facilitate the description of bridge circuit 56, it is convenient to further identify the switches with the legends A–F, and to further identify windings 60 with the legions A–C. Thus, by way of example, if switches 62A and 62E are conducting, then current flows from winding 60B into winding 60A. If rotor 58 is to be torqued in the opposite direction, then switches 62B and 62D would be conducting and current would flow from winding 60A through winding 60B. Pulse width modulation is effected by controlling the time periods during which the various switches are in conduction.

Controller 108 provides a reference signal at terminal A1 for comparators 106 and a sector select signal at terminal B1 for switch 110 to either select a specific comparator or to sequentially sample each of the comparators. The reference signal at terminal A1 and the select signal at terminal B1 of controller 108 may be provided by circuitry within the controller 108 or, alternatively, may simply be coupled through the controller 108 via the terminals A2 and B2 from a position measuring unit 122 (described hereinafter with reference to FIGS. 7 and 8).

Position measuring unit 122 is utilized for accurately tracking the position of rotor 68 when system 50 operates in a position following mode. The position measuring function is accomplished by setting a value for the reference signal at terminal A1 corresponding to a value of Hall voltage which is to be reached at a future time and providing a signal at terminals B1–B2 for selecting the appropriate comparator output signal. When the logic level of the signal at terminal D changes this indicates that rotor 68 has attained the position corresponding to the value of the reference signal at terminal A1.

A velocity measuring unit 124 is also provided for measuring the velocity of rotor 58 when system 50 operates in a velocity tracking mode. Velocity measuring unit 124 measures velocity either by counting sector change signals at terminal F over a predesignated interval of time or by counting clock pulses between sector change signals at terminal F and obtaining the reciprocal of the count. The first method of velocity measurement is preferred for high speed rotation and the second for low speed rotation.

A velocity/position command unit 126 selects either the position measurement from terminal G of position measuring unit 122 or the velocity measurement at terminal M of velocity measuring unit 124 and couples it to terminal L of current modulator 120 (described hereinafter with reference to FIG. 9). Command unit 126 also directs controller 108 by a signal at terminal R to apply either the reference and select signals at terminals A2 and B2 or the corresponding signals at terminals A1 and B1 to comparators and switch 110. In addition, command unit 126 designates a specific value of position or velocity at terminal K which is applied to current modulator 120 and serves as the commanded position or velocity which is to be tracked by system 50. As shown later in connection with FIG. 11, modulator 120 compares the commanded and measured quantities at terminals K and L and develops a current command signal at terminal I based thereon.

The current command signal at terminal I of modulator 120 serves as a partial address for ROM 116 and provides for pulse width modulation of the currents in windings 60. Pulse width modulation is accomplished by setting adjustable upper and lower bounds for a desired average value of the currents in the windings 60. A current command signal at terminal I is initiated whenever the measured current at terminal J falls below the lower bound, and is terminated whenever the measured current at terminal J rises above the upper bound.

Switch 128 is operated by ROM 116 to select the appropriate current sensor 64 for providing the current measurement at terminal J, depending on which windings are energized. Thus, as ROM 116 commutates the winding currents, it also commutates the signals from current sensors 64. With reference to the preceding example wherein current flowed through windings 60A and 60B, but no current flowed through winding 60C, switch 128 insures that terminal J is coupled either to current sensor 64A or to current sensor 64B, but not to current sensor 64C.

Referring now to FIG. 6, sector unit 114 comprises ROM 130, delays 132 and 134, and comparators 136 and 138. Sector unit 114 converts the gray code signal in register 112 to the sector identification signal at terminal E and to sector change signals at terminal F. As is shown in FIG. 6, there are two sector change signals, one indicating a sector change accompanied by clockwise rotation of rotor 58 and the other indicating a sector change accompanied by counterclockwise rotation. In response to an address from register 112, ROM 130 provides three digital words, the first being a numerical identification of the present sector, the second being a numerical identification of the next sector in the event that the rotor 58 is rotating in the clockwise direction, and the third being a numerical identification of the next sector in the event that the rotor 58 is rotating in the counter-clockwise direction.

Sector unit 114, as well as other units in FIG. 1, are controlled by timing and clock signals from a system timer located in command unit 126. Successive comparisons are made between the present sector and each of the next sectors by comparators 136 and 138 in response to clock signals which are provided by the system timer. Delays 132 and 134 delay the application of the corresponding sector signals to comparators 136 and 138 so that the outputs from the comparators represent comparisons of the present sector with the previously predicted values of the next sector. The clock pulses occur many times during each sector and many comparisons are made during each sector. If no equality is found by either comparator a logic zero is produced at both output terminals, indicating that no sector change has occurred. If a sector change has occurred with clockwise rotation, then the present value of the sector will be equal to the previously predicted value of the next sector for clockwise rotation, and comparator 138 will produce a logic 1. Similarly, if a sector change has occurred with counterclockwise rotation, the value of the present sector will be equal to the previously predicted value of the next sector for counterclockwise rotation, and comparator 136 will produce a logic 1.

Referring now to FIG. 7, controller 108 includes terminals A1, B1, A2, B2 and R which were previously described with reference to FIG. 1. Controller 108 comprises switch 140, D/A converter 142, source 144 (such as a digital encoder providing a reference signal of zero value), and counter 146 (which counts modulo 3). The modulo 3 counting corresponds to the three Hall sensors 66 of FIG. 1. As shown, switch 140 couples a reference signal from terminal A2 to terminal A1, the reference being utilized by comparators 106 for comparison with the sinusoidal waveforms produced by Hall sensors 66 upon rotation of disc 68. Also, as shown, switch 140 couples a Hall select signal from terminal B2 to terminal B1 for operating switch 110 of FIG. 1 to select a comparator 106 and its corresponding Hall sensor 66. The signals at terminals A2 and B2 are provided by position measuring unit 122.

In the alternate position of switch 140 the reference signal for terminal A1 is provided by source 144 and the selector signal at terminal B1 is provided by counter 146. In response to clock signals from the system timer counter 146 provides a sequence of three addresses for switch 110 causing it to sequentially sample the output signals from comparators 106. Switch 140 is operated by the signal at terminal R provided by command unit 126.

Referring now to FIG. 8, positioning measuring unit 122 comprises counter 180, source 182 of a digital word representing the numeral 1, summer 184, register 186, switch 188, ROM 190 and ROM 192. ROM 192 provides the reference signal at terminal A2 and the selector signal at terminal B2 in response to an address from ROM 190 indicating the position of the rotor in electrical degrees. As seen in graph 194 located adjacent ROM 192, the reference signal at terminal A2 is a stepwise signal that tracks the sinusoidal waveform provided by Hall sensors 66 upon rotation of rotor 58. The values of the reference signal precede the occurrences of the corresponding values of the Hall voltage. In other words, the system waits until the rotor 58 has experienced an incremental rotation which brings the Hall voltage up (or down) to the value of the reference signal. When that occurs a comparator 106 changes state, signifying that rotor 58 has attained a specific, known position.

Referring to the graph of FIG. 5, it will be noted that only the linear regions of the Hall voltages are utilized. Accordingly, in the graph 194 in FIG. 8, the stepwise changes in the reference signals are shown only during the linear portions of the trace representing the Hall voltage. In accordance with FIG. 5, a different Hall trace is selected at the midpoint of each sector so as to utilize only linear portions. That selection is accomplished by switch 110 of FIG. 1 in response to the signals at terminals B1 and B2. Since ROM 192 provides both the value of the reference at terminal A2 as well as the selector signal at terminal B2, the selection of the Hall trace is coordinated for all values of the reference signal.

Counter 180 provides a count which is coupled by switch 188 to ROM 192 and constitutes a partial address. The remainder of the address is provided by the speed signal at terminal M. The count from counter 180 on line 198 represents, apart from a scale factor, the position of the rotor 58 appearing on line 196. Thus, if each count on line 198 represents 5 degrees, then a total of 72 counts represents 360 degrees. Similarly, if each count on line 198 represents 20 degrees, then a count of 18 on line 198 represents 360 degrees. When ROM 190 produces the digital word representing 360 degrees, it also provides a reset signal which is coupled to the reset terminal of counter 180 by line 200 for resetting counter 180 to zero. The scale factor utilized by ROM 190 is determined by the speed signal at terminal M. ROM 190 contains different sets of the words which can appear on line 196, one set corresponding to each of several different selected speeds at terminal M. By using different scale factors, the magnitude of the stepwise increments of the reference signal at terminal A2 is increased at high speed and there are fewer steps per sector at high speed. Given this scaling, the rate at which comparators 106 are sampled can remain substantially unchanged despite large variations in the speed of rotation.

Since counter 180 is reset every 360 electrical degrees, a second counter 202 is provided for counting in synchronism with counter 180, but without periodic resetting. In this manner, the count of counter 202 represents the present position of the rotor or of a load mechanically coupled to the rotor by a gear train.

Counter 180 must be able to count up or down depending on the direction of rotation of rotor 58. To sense the proper direction of counting, a value of 1 from source 182 is subtracted from the count on line 198 by summer 184, the difference being stored in register 186. Switch 188 is thus provided with a choice of two input signals, the count on line 198 and a number equal to one less than the count on line 198 from the register 186. Switch 188 is toggled between the two input signals by a switch control line which is activated by a flip-flop 204 which in turn is toggled by clock pulses from the system timer. The switch control signal on line 206 is coupled by a register 208 to the up/down control terminal of counters 180 and 202.

The Hall comparator output signal at terminal D of switch 110 in FIG. 1 is coupled to register 208 by switch 216 for strobing the register to accept the switch control signal on line 206. The presence of the comparator output signal on line 210 indicates that a successful comparison has been made between the Hall voltage and either the reference signal corresponding to the count on line 198, or the reference signal corresponding to the decremented count from the register 186. The toggling between the count on line 198 and the decremented count is also shown in the graph 194 wherein the value of the reference oscillates back and forth as shown by the dotted trace 212. Thus, the switch control signal present on line 206 when a Hall comparator output signal is present on line 210 represents the direction of rotation of the rotor 58. Upon strobing the signal on line 206 into register 208, counters 180 and 202 are made to count up, or count down, in accordance with the direction of rotation of the rotor 58. To insure that counters 180 and 202 do not advance until after the switch control signal on line 206 has been strobed into register 208 and the direction of counting fixed, a delay 214 is interposed between line 210 and counters 180 and 202.

With reference to the quasi-linear regions in the graph of FIG. 5, it is noted that alternate ones of the regions alternate in their respective slopes. Thus, a positive error signal obtained with one slope corresponds to a negative error signal obtained with the next slope. To compensate for the foregoing shift in polarity, switch 216 and inverter 218 are provided in FIG. 8 between terminal D and the line 210. Switch 216 selects either the signal at terminal D or its complement. Switch 216 is operated by ROM 192 in syncrhonism with the selection of Hall sensors 66 so that the Hall comparator output signal on line 210 is always of the correct polarity for strobing register 208 and for advancing the count of counters 180 and 202. The comparator signal on line 210 also strobes register 220 for reading the position count of counter 202 before it advances to the next count.

Acquisition circuitry is also provided to initially acquire the position of rotor 58 so that position tracking can commence. The acquisition circuitry includes ROM 222, summer 224, successive approximation register 226 and inverter 228. The count of counter 180 is first brought into the proper sector by means of ROM 222, which is coupled by summer 224 to the preset terminal of counter 180. The sector signal on terminal E, seen also in FIG 1, addresses ROM 222 to provide the count designating the beginning of that sector. Accordingly, counter 180 begins to count at the beginning of the sector. That count is then modified by summer 224 which adds a signal from register 226 to the signal from ROM 222. Successive approximation register 226 provides digital words representing a set of numerical values which oscillate in magnitude and decrease toward a stable value. Register 226 is controlled by a feedback signal on line 210 which indicates to register 226 that the value of its output digital word is to be incremented or decremented. The logic state (1 or 0) of the signal on line 210 depends on whether the value of the reference signal is greater than or less than the value of the Hall voltage. Register 226, therefore, responds to the logic level on line 210 to continuously advance the presumed position of the rotor 58 until the logic level on 210 shifts at which point the register 226 decrements the presumed position of the rotor 58. At the end of the sequence of the successive approximations, the preset value of counter 180, as well as that of counter 222, accurately reflects the position of rotor 58.

Figure 9:
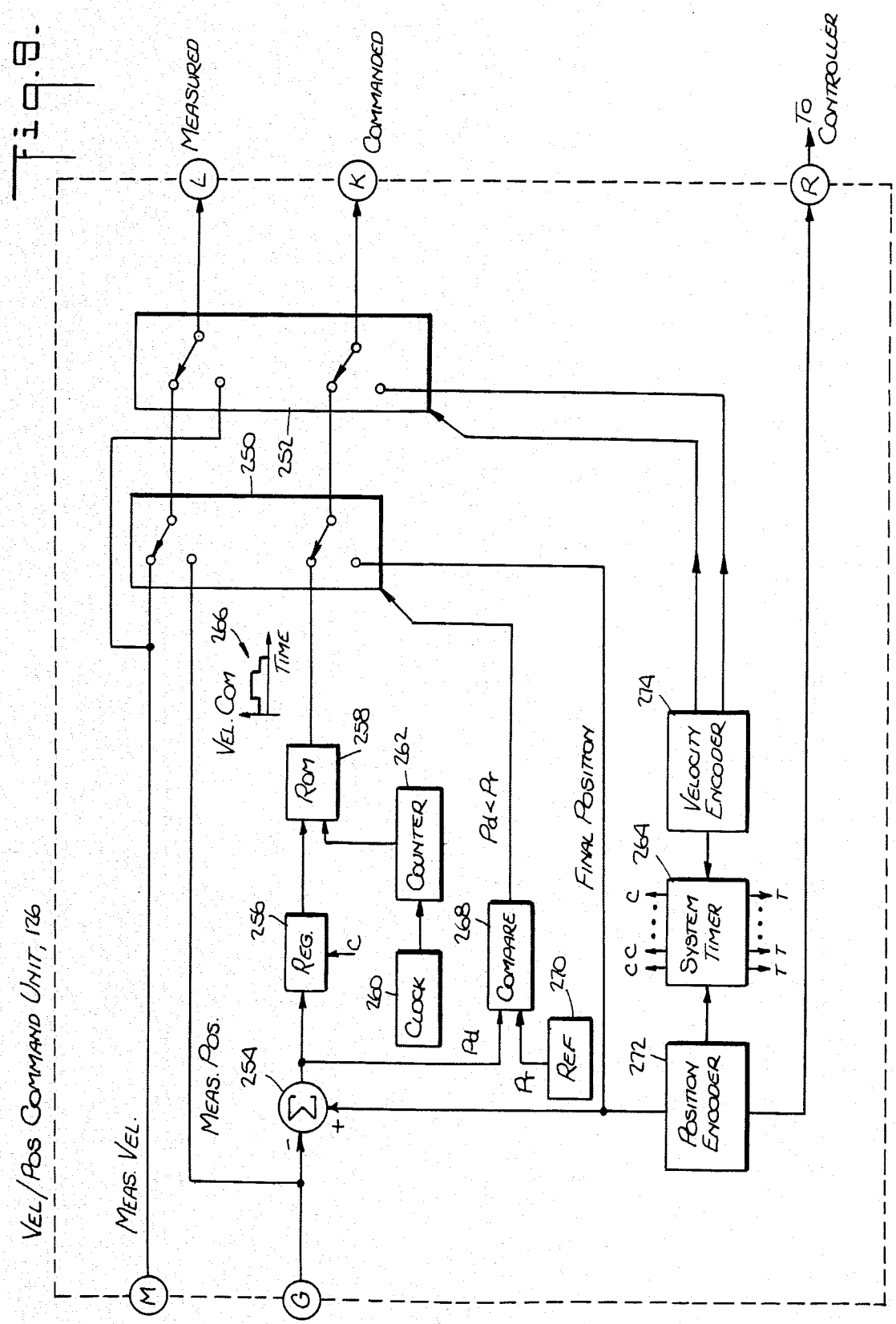
FIG. 9 is a functional block diagram of a velocity/position command unit of FIG. 1.

Referring now to FIG. 9, velocity/position command unit 126 has terminals M, G, L, K and R which were previously seen in FIG. 1. Command unit 126 comprises switches 250 and 252, summer 254, register 256, ROM 258, clock 260, and counter 262. With switches 250 and 252 in the positions shown, the measured velocity at terminal M is coupled directly to terminal L and the commanded velocity signal appears at terminal K. The commanded velocity signal is provided by ROM 258 based on a desired position to which the rotor 58 of FIG. 1 is to be rotated. ROM 258 is, therefore, utilized in a composite mode of operation wherein the rotor is brought to a designated position in a two-step operation. The first step involves operating the motor at a high speed, or with a designated velocity profile, to bring the rotor to approximately the desired position. Thereafter, the system operates in a position following mode. During the first step, velocity signals appear at both terminals L and K, the commanded velocity appearing at terminal K and the measured velocity appearing at terminal L. During the second step, the commanded position appears at terminal K and the measured position appears at terminal L. Switch 250 accomplishes the transfer in operation between the first and second steps. Switch 252 is utilized to replace the two-step operation with a velocity following mode of operation. In the velocity following mode, a measured velocity appears at terminal L while a commanded velocity appears at terminal K.

With respect to the two-step operation, the velocity profile is provided by ROM 258 in response to a succession of address signals coupled thereto from counter 262 which counts clock pulse signals from clock 260 under command of a timing signal at terminal T. The aforementioned system timer, here identified by the legend 264, provides the timing signal at terminal T for operating clock 260 as well as the timing signals and clock pulse signals for the other units of the system 50 shown in FIG. 1. Accordingly, as the counter 262 advances, ROM 258 provides a succession of output words setting the velocities at which the rotor is to rotate at specific instants of time, a simple form of velocity profile being shown in a graph 166 located adjacent ROM 258.

Counter 262 provides only a partial address to ROM 258, the remainder of the address being provided by register 256. Register 256 stores the difference between the desired final position and the present position of the rotor 58. In accordance with the portion of the address provided by register 256, the velocity profile of ROM 258 is altered for relatively short distances of rotor travel where it would be impractical to bring the motor up to maximum speed. Accordingly, the partial address from register 256 selects an appropriate one of a set of velocity profiles for use for relatively small differences in position.

Command unit 126 further comprises comparator 268, reference 270 (comprising a source of a digital word representing a position error limit), position encoder 272 (for designating a desired end position for the rotor), and velocity encoder 274 (for designating a desired velocity at which the motor is to operate). In lieu of encoders 272 and 274, it is to be understood that digital words provided by an external system, such as an inertial navigator of an aircraft, may be entered into the system at this point for designating a desired position and/or a desired velocity. Encoders 272 and 274 strobe system timer 264 to begin timing the various system operations.

Summer 254 produces a position error signal by subtracting the measured position signal at terminal G from the desired position designated by encoder 272. This difference signal, in addition to being applied to register 256, is also coupled to comparator 268 which compares the difference in position with a reference corresponding to a position error limit. If the difference in position is less than the reference (the position error being less than the position error limit), then comparator 268 activates switch 250 and the measured position at terminal G is coupled to terminal L and the designated final position of the rotor 58 is coupled to terminal K. The transition between the first and second steps in the two-step operation for bringing the rotor 58 to a designated position has thus been accomplished.

Switch 252 can be actuated by velocity encoder 274 so that only the velocity, as commanded by encoder 274, appears at the terminal K. Thus, command unit 126 permits the system to operate either in a velocity following mode or in the two-step sequence comprising a velocity tracking mode followed by a position tracking mode. The two-step sequence is initiated by position encoder 272 which produces a signal at terminal R for operating switch 140 in controller 108 (FIG. 7). Position encoder 272 causes the reference signals and the Hall selection signals appearing at terminals A2 and B2 of position measuring unit 122 (FIG. 8) to appear at terminals A1 and B1 of controller 108 for operation of comparators 106 as previously described.

Figure 10:
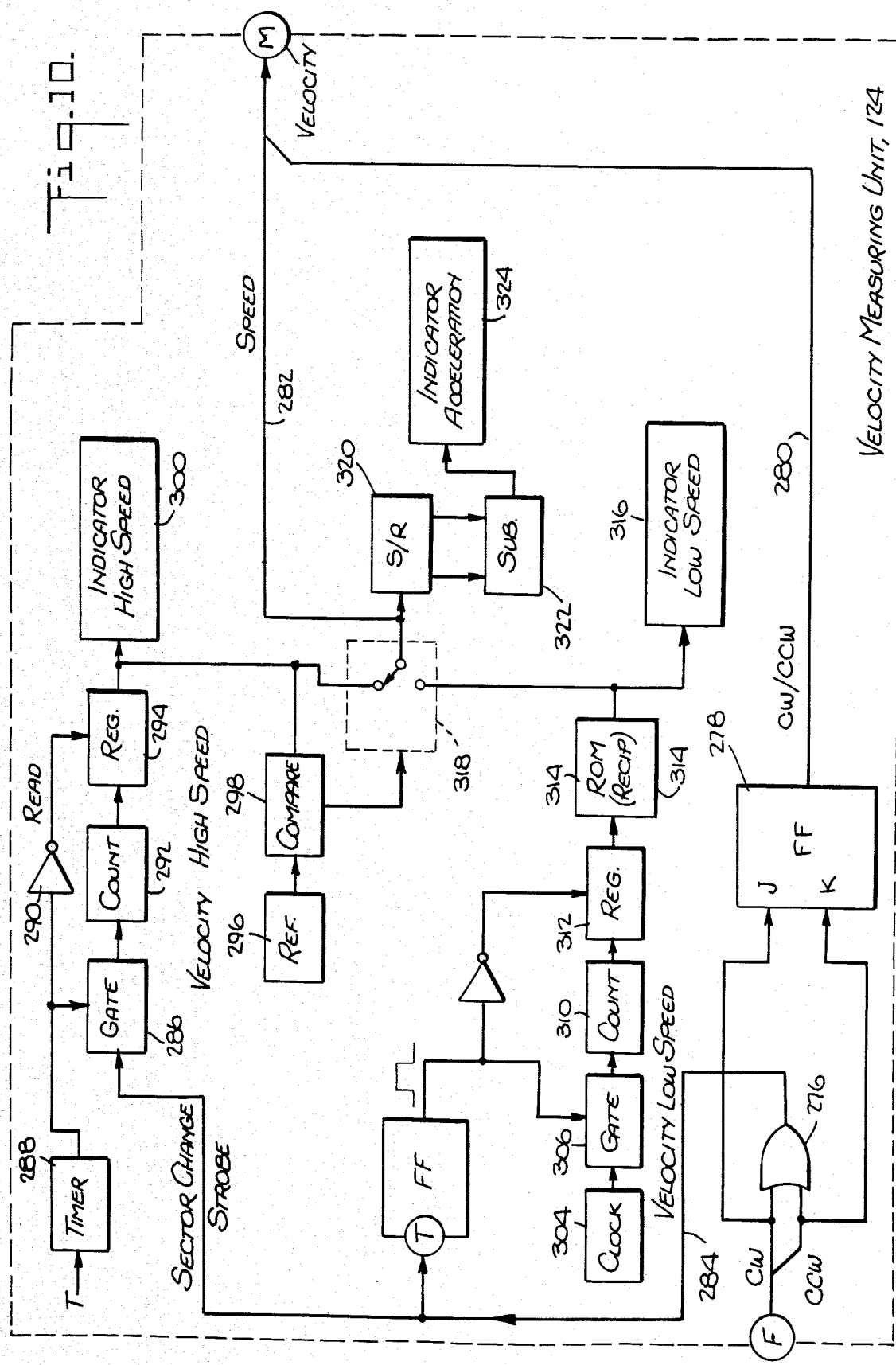
FIG. 10 is a block diagram of a velocity measuring unit of FIG. 1.

Referring now to FIG. 10, velocity measuring unit 124 comprises two channels, the upper channel being utilized for high speed, and the lower channel for low speed. The direction of rotation is provided by OR gate 276 and J-K flip-flop 278 which are coupled to the two sector change signals at terminal F. The direction of the rotation, appearing on line 280, and the speed of rotation, appearing on line 282, provide a complete description of the velocity. OR gate 276 provides on line 284 either the clockwise change signal or the counterclockwise change signal from terminal F, the signal on line 284 thereby signifying a change in sector irrespective of direction of rotation. J-K flip-flop 278 provides on line 280 a logic 1 or a logic 0 depending on which of the sector change lines at terminal F is at a logic 1 state. Accordingly, the logic state of the signal on line 280 signifies the direction of rotation.

The upper channel of FIG. 10 comprises gate 286, timer 288, inverter 290, counter 292, register 294, source 296 of a reference signal, comparator 298 and an indicator 300 of speed. The lower channel comprises flip-flop 302, clock 304, gate 306, inverter 308, counter 310, register 312, ROM 314 and an indicator 316 of speed. The upper and lower channels are coupled by switch 318 to shift register 320, the output of which is coupled by a subtractor 322 to an indicator 324 of acceleration.

For measuring high speed rotation, counter 292 counts the sector change signals on line 284, a sequence of sector change signals being passed by gate 286 to counter 292 in response to a timing signal from timer 288. Operation of timer 288 is initiated by a timing signal at terminal T from system timer 264 (FIG. 9). The number of sector change signals counted by counter 292 during the predetermined interval of time is proportional to the speed of rotation and is therefore, apart from a scale factor, equal to the speed of rotation. Register 294 is strobed by timer 288 via inverter 290 to read the contents of counter 292 at the conclusion of the counting interval. The resulting count stored in register 294 is applied to indicator 300 for presenting an indication of speed.

For measuring low speed rotation, counter 310 counts pulses from clock 304 during the interval of time which elapses between consecutive sector change signals on line 284. The clock pulses from clock 304 are passed by gate 306 to counter 310, gate 306 being activated by the toggling of flip-flop 302 by successive ones of the sector change signals on line 284. At the conclusion of the counting interval, the trailing edge of the pulse from flip-flop 302 is passed by inverter 308 to strobe register 312 which stores the contents of counter 310 for addressing ROM 314. The count in register 312 is proportional to the interval between successive sector change signals. Since the speed of rotation is inversely proportional to the interval between successive sector change signals, ROM 314 provides output words which are numerically equal to the reciprocal of the address signal applied to ROM 314. The output from ROM 314 is applied to indicator 316 for presenting an indication of speed.

To provide an indication of acceleration, successive values of speed are stored in shift register 320. The successive values are then applied to subtractor 322 which determines the difference between the two speed measurements. The difference signal from subtractor 322 is then applied to indicator 324 for presenting an indication of acceleration.

To provide an indication of speed on line 282 as well as an indication of acceleration, for both high speed and low speed, switch 318 selects either the output of register 294 or the output of ROM 314. Switch 318 is driven by comparator 298 which compares the speed signal at the output of register 294 with a reference signal provided by source 296. When the output from register 294 is greater than the reference, comparator 298 places switch 318 in the high speed position and couples the output from register 294 to line 282. When the output from register 294 drops below the reference, comparator 298 places switch 218 in the low speed position and couples the output from ROM 314 to line 282.

Referring now to FIG. 11, current modulator 120 comprises ROM 350, D/A converters 352 and 354, amplifier 356, comparators 358 and 360, and flip-flop 362. ROM 350 receives an address on line 364 which designates the desired amplitude and sense of the current for the windings 60 (FIG. 1). The value of the current commanded via the address on line 364 is related to the average value of the current. The actual current, as measured by the current sensors 64 (FIG. 1) and coupled to modulator 120 via terminal J, is portrayed in graph 366 located adjacent terminal J in FIG. 11.

To energize the windings by switches 62 of bridge circuit 56 (FIG. 1), ROM 350 provides a one-bit signal on line 118 designating the sense of the current corresponding to a clockwise or counter clockwise motor torque. In addition, ROM 350 provides two digital words in response to the address on line 364, one being an upper current limit, which is applied to D/A converter 352, and the other being a lower current limit, which is applied to D/A converter 354. The analog voltages produced by converters 352 and 354 are applied as reference signals to comparators 358 and 360 respectively. The measured current at terminal J is amplified by amplifier 356 and applied to comparators 356 and 358. If the amplitude of the measured current exceeds the upper bound, comparator 358 produces a logic 1 signal which sets flip-flop 362. If the value of the measured current is less than the lower bound, comparator 360 produces a logic 1 signal which resets flip-flop 362 The output of flip-flop 362 is connected by terminal I to bridge control ROM 116 (FIG. 1) and is either a logic 1 or a logic 0. One of these logic states causes ROM 116 to initiate a current command, while the other causes ROM 116 to terminate a current command. Thus, for an exemplary current having a positive sense, when the current reaches the upper bound, a current command is terminated, and when the current reaches the lower bound, a current command is initiated. The signal at terminal I is also shown by the dashed trace in graph 366. In view of the inductance and filtering effect of windings 60, sharp current pulses do not appear but, rather, relatively small amplitude undulations composed of exponentially increasing and decreasing components are produced, the current undulating about the average value.

As previously noted, the signals at terminals K and L may be either position or velocity signals, the signal at terminal K being the desired value and the signal at terminal L the measured value. The current command signal on line 364 results from an integration of the difference between the signals at terminals K and L. The digital word representing the difference between the signals at terminals K and L is simply a one bit word in this illustrative embodiment of the invention, it being understood that multiple bit words may also be utilized.

The one bit word describing the difference between the signals at terminals K and L is produced by comparator 368. The integration operation begins with summer 370, register 372 and a source 374 of a digital word having a value of unity. The output of register 372 is coupled to one input of summer 370. The output of source 374 is coupled to the other input of summer 370. The output of comparator 368 serves as a sign bit for ordering the summer 370 to add, or subtract, the signal from source 374 to the contents of register 372. Upon successive strobing of register 372, the value of the contents of register 372 rises or falls in accordance with the sign bit from comparator 368. The strobing of register 372 is accomplished by the two sector change signals at terminal F which are coupled by OR gate 376 to register 372 to provide strobing at the beginning of each sector irrespective of the direction of rotation.

Modulator 120 further comprises sources 378 and 380 of reference signals, comparators 382 and 384, OR gate 386, a source 388 of a digital word having a value of unity, summer 390, register 392 and source 394, which may be an encoder, which provides a digital word which presets register 392 to a specific value.

The output of register 372 is compared with an upper reference from source 378 and with a lower reference from source 380 by means of comparators 382 and 384, respectively. If the register output is greater than the upper reference or less than the lower reference, then comparator 382 or comparator 384, respectively, passes a logic 1 signal via OR gate 386 to strobe register 392. The logic level of comparator 384 also serves as a sign bit for operating summer 390 in the same fashion as was described previously for summer 370. With each strobing of register 392, the content thereof is incremented or decremented by 1 from source 388 in accordance with the logic level of the sign bit from comparator 384. Thus, for small changes in the value of the contents of register 372, there is no strobing of register 392. However, if register 372 experiences a relatively large change, then successive strobings of register 392 occur with a consequent incrementing or decrementing of the value of the number stored therein. The value of the contents of register 392 appears on line 364 as the address of ROM 350. In this manner current modulator 120 provides a filtering operation via an integration of the loop error signal (the difference between the signals at the terminals K and L) to accomplish closed loop feedback control.

In operation, when the desired velocity (or position) exceeds the measured velocity (or position) over an interval of time extending through a plurality of sectors, the reference signals for comparators 358 and 360 are raised by ROM 350 to increase the average value of the current in the motor windings. Similarly, when the value of the signal at terminal K drops below that of the signal at terminal L, ROM 350 lowers the value of the reference signals to comparators 358 and 360, with a resultant diminution in the average value of the winding current.

Figure 12:
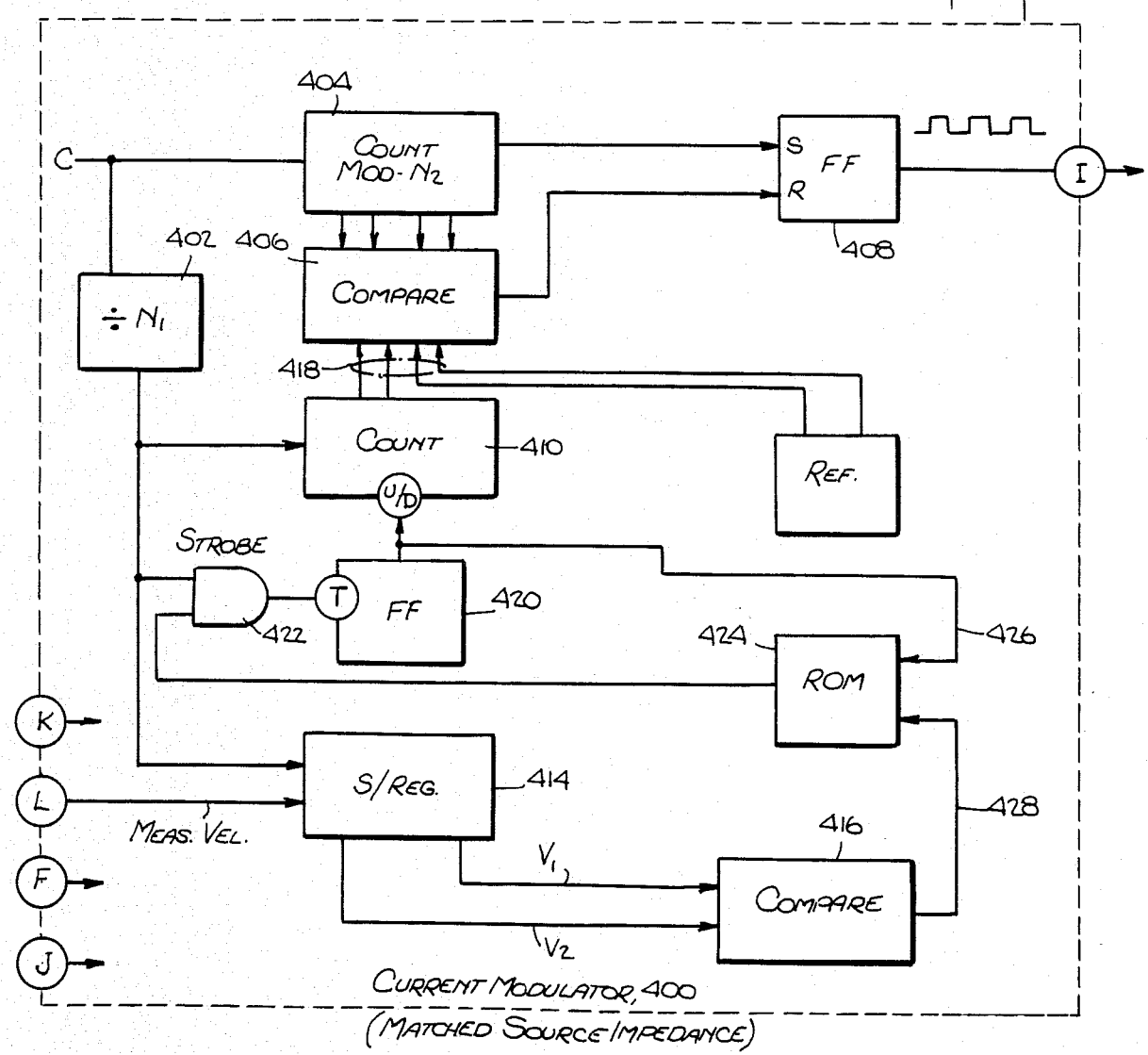
FIG. 12 is a block diagram of a current modulator of FIG. 1 for a power transfer maximizing mode of motor operations.

Referring now to FIG. 12, there is shown an alternative form of current modulator 400 which may be utilized in place of modulator 120 when a position or velocity following mode of operation is not desired. Modulator 400 can be used when it is desired to maximize the power obtained from a motor utilizing a power source of limited capacity, such as a solar cell. In certain operations, such as the pumping of water, the actual speed of the motor driving the pump (not shown) need not be maintained at a predetermined value since water can be pumped at varying rates. The product of the motor torque and the motor speed, however, is determinative of the motor power output and the amount of water which can be pumped. Accordingly, current modulator 400 varies the apparent impedance presented by the motor to the source, as well as the speed of rotation, to provide maximum power transfer from the source to the motor.

Modulator 400 comprises frequency divider 402 (for dividing down the frequency of the clock pulses), counter 404 (for counting the clock pulses), comparator 406, flip-flop 408, counter 410, a source 412 of a digital word, shift register 414, and comparator 416. Flip-flop 408 is successively set and reset by counter 404 and comparator 406 to provide a pulse train at terminal I wherein each pulse is at a logic level of 1 and the space between pulses is at a logic level of 0. The duration of each pulse at terminal I is equal to the duration of a current pulse commanded by ROM 116 (FIG. 1). A variation in the duration of the pulses at terminal I results in a corresponding variation in the duty cycle of the current pulses applied by bridge circuit 56 (FIG. 1). When the duty cycle is low, relatively little current flows, on the average, from source 54. With a higher duty cycle, more current flows. Thus, the ratio of the voltage of source 54 to the average current provided thereby can be made to vary with a resultant shift in the magnitude of the apparent impedance of the motor. Also, there is a corresponding change in the power applied to the motor, namely, the product of the voltage of source 54 times the average current.

To test whether the motor is receiving maximum power, modulator 400 monitors the measured velocity at terminal L. The signals at terminals K, F and J are not utilized by modulator 400. Modulator 400 provides a slow variation in the duty of the signal at terminal I, the variation being slow as compared to the dynamic response time of the motor 52 and its load. A variation in the duty cycle may result in either an increase or a decrease in the speed of rotation. Assuming that the load, such as the aforementioned water pump, produces a relatively constant torque against the rotor over a useful range of motor speeds, then motor speed may be taken as a measure of the power output of the motor. Accordingly, by observing the motor speed resulting from a slow variation in the duty cycle, modulator 400 can adjust the duty cycle to provide for the maximum power transfer to the motor.

The outputs from counter 410 and reference 412 comprise a digital word having a value against which comparator 406 compares the contents of counter 404. Counter 404 counts modulus N2 and resets itself, at which time it applies a pulse to the set input of flip-flop 408. Later, when the count reaches the number provided by counter 410 and reference 412, the comparator 406 resets flip-flop 408. If the count of counter 410 and the digital word from reference 412 remain constant, then each pulse of the waveform at terminal I is of constant duration.

A slow variation in the duration of the pulses at terminal I is produced by divider 402 and counter 410. Assuming that the value of N1 of divider 402 is eight times the value of N2, then one clock pulse is applied by divider 402 to counter 411 for every eight output pulses from counter 404 and counter 410 slowly advances its count. The most signifcant bits of the digital word from counter 410 and reference 412 are of constant value and are provided by reference 412. The least significant bits are provided by counter 410. There is, therefore, a slow variation of and a relatively small change in the number provided by counter 410 and reference 412.

Shift register 414 stores successive values of measured velocity at terminal L, one sample of the measured velocity being taken by register 414 with each strobing thereof by a clock pulse from divider 402. Two successive values of the measured velocity are extracted from register 414 and compared in comparator 416. The output signal of the comparator is coupled to the up-/down control of counter 410 by a circuit comprising flip-flop 420, AND gate 422 and ROM 424. ROM 424, in response to a change in the speed of rotor 58, and in response to the direction of the counting by counter 410, provides the logic for commanding a change in the direction of counting by counter 410.

The operation of ROM 424 in conjunction with the other circuit elements is set forth below. Lines 426 and 428 provide the address to ROM 424, line 426 providing a partial address which signals the direction of counting by counter 410. Line 428 provides the remaining portion of the address which signals whether the speed of rotation is rising or falling. If speed is rising, a later velocity sample V2 is larger than an earlier sample V1. If speed is falling, an earlier velocity sample V1 is larger than a later sample V2. Comparator 416 compares the two velocity samples and provides a logic 1 signal on line 428 for rising speed, and a logic 0 signal for falling speed. With respect to line 426, a logic 1 indicates that counter 410 is counting up, while a logic 0 indicates that counter 410 is counting down. Thus, the address to ROM 424 describes both the state of counting and the state of changing speed.

ROM 424 enables AND gate 422 to pass a clock pulse from divider 402 to strobe flip-flop 420. The strobing toggles flip-flop 420 to change the direction of counting by counter 410. For example, if rotor speed is falling while counter 410 is counting up, ROM 424 directs a strobing of flip-flop 420 to alter the direction of counting so that counter 410 counts down. On the other hand, if rotor speed is falling, while counter 410 is counting down, then the ROM 424 commands a strobing of flip-flop 420 to force counter 410 to count up. If rotor speed is rising ROM 424 retains the state of flip-flop 420 by applying a logic 0 signal to AND gate 422. The count of counter 410 is retained at or approximately at the value which results in a duty cycle in the pulse train at terminal I which maximizes the power transfer from the source 54 to the motor 52 of FIG. 1.

Figure 13:
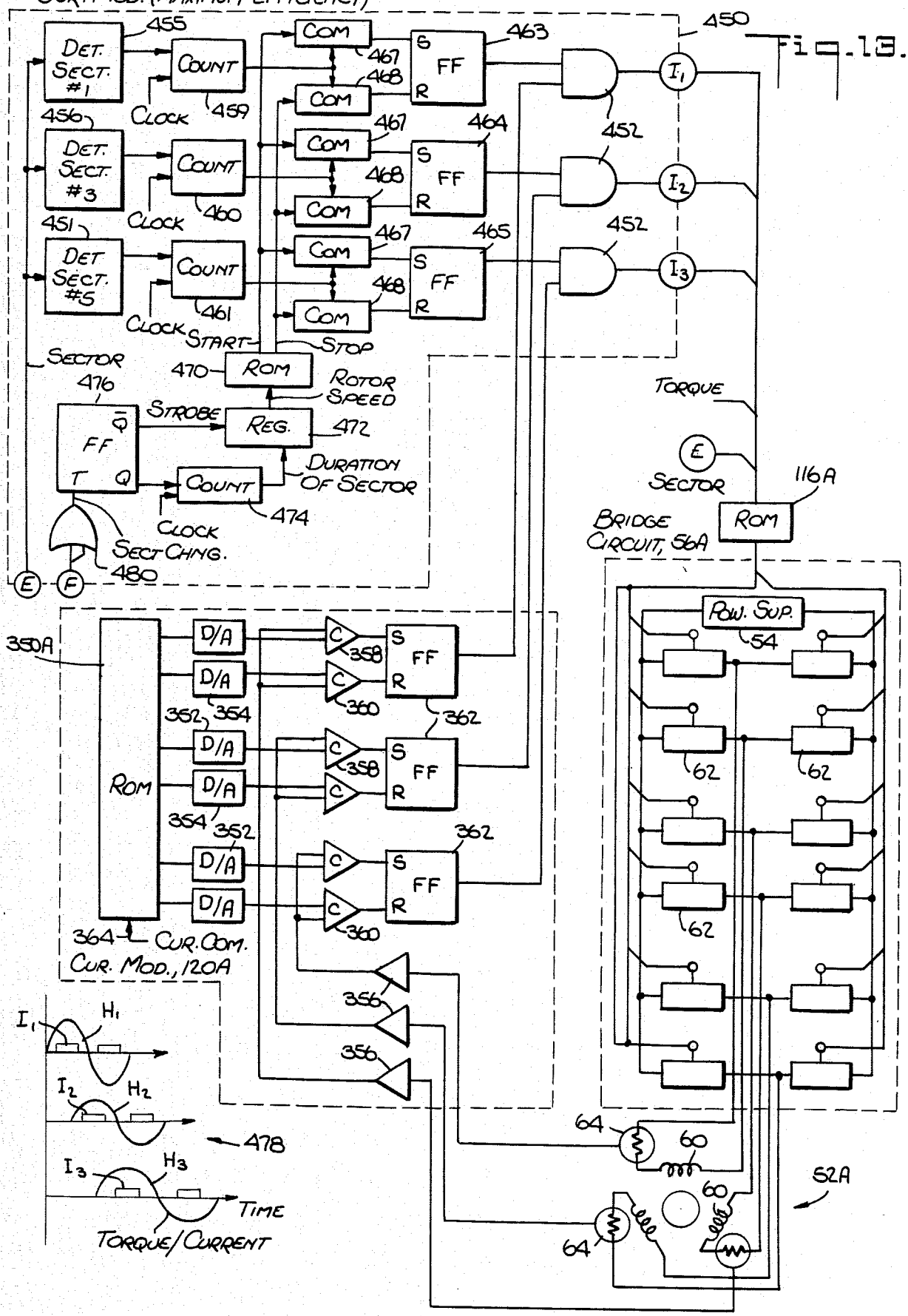
FIG. 13 is a block diagram of a current modulator of FIG. 1 for an efficiency maximizing mode of motor operation.

Referring now to FIG. 13, there is shown a further current modulator 450 which may be utilized with current modulator 120 and bridge circuit 56 of FIG. 1, in slightly modified form, when it is desired to operate a motor at maximum efficiency. Before proceeding with a description of FIG. 13, it is noted that the stator windings of a motor may be connected in a star configuration, the wye configuration of FIG. 1 being one example of a star configuration. Alternatively, windings may not be connected to each other in which event a pair of leads is brought out for each winding for independent excitation thereof. An example of a motor with independently excited windings is the two phase motor wherein the windings are excited with currents that are 90 degrees out of phase so as to produce a rotating magnetic field.

In the case of a motor with independently excited stator windings, it has been found that greater efficiency in the conversion of electrical energy to mechanical energy is obtained by limiting the flow of current in a winding to those intervals of time when the ratio of torque to current is at or near a maximum. The ratio of torque to current varies in accordance with the positions of the rotor poles relative to the stator windings. This ratio varies in a sinusoidal manner with rotation of the rotor, as do the Hall sensor output voltages Thus, the Hall voltages can be utilized to identify the interval of time when the torque to current ratio is at or near maximum to control energization of the windings so as to maximize the efficiency of motor operation. Current modulator 450 of FIG. 13 terminates current flow during those periods when the torque to current ratio is relatively low and thereby maximizes motor operating efficiency.

To illustrate the connection of current modulator 450 with a motor, the three windings 60 of FIG. 1 have been retained, but have been independently connected to a bridge circuit by bringing out a pair of leads for each winding as shown in modified motor 52A in FIG. 13. Given these additional leads, bridge circuit 56 of FIG. 1 has been modified to form bridge circuit 56A of FIG. 13 wherein additional branches with switches 62 are provided. A set of four switches 62 is now employed for each winding 60. Power supply 54 is coupled to each of the switches 62 following the connections FIG. 1. ROM 116 of FIG. 1 is modified to form ROM 116A of FIG. 13 by providing additional storage and output lines for control of the additional switches in bridge circuit 56A.

In current modulator 120 of FIG. 11, a single output terminal I had been provided for commanding the current to bridge circuit 56 of FIG. 1 since a single current flows through the windings of the motor 52. However, in the case of motor 52A of FIG. 13 wherein several currents may flow at one time, current modulator 120 of FIG. 11 is modified in accordance with current modulator 120A of FIG. 13 to provide additional output control lines. In FIG. 13, only a portion of current modulator 120A is shown, the remainder being identical to that of current modulator 120 of FIG. 11. Thus, in lieu of the single flip-flop 362 of FIG. 11, three flip-flops 362 are provided in modulator 120A of FIG. 13. The number of D/A converters and the number of comparators and amplifiers have been similarly increased. Thus, there are three sets of the comparators 358 and 360, three sets of the converters 352 and 354, and three of the amplifiers 356. Switch 128 of FIG. 1 has been deleted in the embodiment of FIG. 13 since the signals from all three current sensors 64 are now required simultaneously for operation of the three sets of comparators 358 and 360 for comparing the amplitudes of the respective winding currents with the upper and lower current bounds provided by the three sets of the converters 352 and 354. In addition, ROM 350 of FIG. 11 has been modified to form ROM 350A of FIG. 13 by the inclusion of additional storage and output lines for accommodating the additional sets of converters 352 and 354. The current command signal on line 364 which addresses ROM 350A of FIG. 13 is the same current command signal on line 364 which addresses ROM 350 in FIG. 11.

The additional current modulator circuit 450 of FIG. 13 is coupled between the output terminals of current modulator 120A and the input terminals of bridge circuit 56A. By comparison with the circuitry of FIGS. 1 and 11, wherein the signal at terminal I from the single flip-flop 362 is coupled directly as an address line to ROM 116, the circuit of FIG. 13 provides that the outputs from flip-flops 362 in modulator 120A are coupled by AND gates 452 in modulator 450 and via respective terminals I1, I2 and I3 as address lines to ROM 116A. The other address lines to ROM 116A are the torque and sector signals as described in FIG. 1. Thus, the arrangement of connections in FIG. 13 follows that of FIG. 1 with the exception that three current command lines are provided in FIG. 13 in lieu of the single current command line in FIG. 1 and each current command line passes via an AND gate 452 in the additional modulator circuit 450. AND gates 452, as will now be described, inhibit the passage of the current command signals from flip-flops 362 during those intervals of time when the ratio of torque to current is too low to maximize the efficiency of the motor 52A.

Current modulation circuit 450 further comprises detectors 455, 456 and 457, counters 459, 460 and 461, flip-flops 463, 464 and 465, a set of three comparators 467, a set of three comparators 468, ROM 470, register 472, counter 474, and flip-flop 476. Detectors 455-457 decode the sector signal at terminal E of FIG. 1 and detect the first, third and fifth sectors corresponding to zero, 120 and 240 electrical degrees.

In response to an appropriate signal at terminal E, detectors 455-457 strobe corresponding counters 459-461 to count clock pulses, the count in each counter representing the time elapsed in each sector. The counts in counters 459-461 are applied to the sets of comparators 467-468 for comparison with a pair of digital words from ROM 470, the words designating the start and the stop times during which current can be efficiently applied to the motor windings during the sectors defined by the respective Hall voltages. Comparators 467-468 are coupled respectively to the set and reset terminals of flip-flops 463-465 which produce output pulses designating the intervals during which current is applied to the corresponding motor windings. The outputs from flip-flops 463-465 activate respective ones of AND gates 452 for passing the current command signals to ROM 116A.

Graphs 478 in FIG. 13 show the sinusoidal variation in the ratio of torque to current as a function of time or, equivalently, as a function of rotor rotation. As previously noted, both the Hall voltages and the ratio of torque to current vary in a sinusoidal fashion. Accordingly, each of the traces in graphs 478 is also labeled with the corresponding Hall voltage. The digital signals at terminals I1-I3 which command the application of current to the respective motor windings are also shown in graphs 478, the signals being identified by the legends I1-I3. Graphs 478 show that the signals I1-I3 start after a zero crossing of the corresponding sinusoidal trace and terminate before the next zero crossing. The start and the stop signals applied by ROM 470 to comparators 467-468 correspond to the leading and the trailing edges of the current command signals I1-I3 as shown in graphs 478.

The start and stop times for the current command signals depend on the speed of rotation of the rotor. For example, if the duration of a current command signal were to equal 20 degrees of the sinusoidal trace of the ratio of torque to current, the actual duration of the current command signal must be greater than 20 degrees at slow speeds, and less than 20 degrees at fast speeds. Accordingly, ROM 470 stores words designating the start and the stop times for different speeds of rotation.

A signal provided by register 472 addresses ROM 470 for selecting the start and stop words corresponding to the various speeds of rotation. The address signal provided by register 472 is obtained by means of flip-flop 476 and counter 454 which measure the duration of a sector. Flip-flop 476 is toggled by either of the sector change signals which are coupled to flip-flop 476 from terminal F via OR gate 480. Counter 474 is strobed by flip-flop 467 to begin counting clock pulses, the count terminating upon the next toggling of flip-flop 476. Also, when counter 474 stops counting, flip-flop 476 strobes register 472 to read the count of counter 474.

The output from register 472 is applied as the address to ROM 470 and is, therefore, the duration of the sector, which is proportional to the reciprocal of the rotor speed. Thus, ROM 470 selects the appropriate start and stop words in accordance with the speed of rotation of the rotor.

Figure 14:
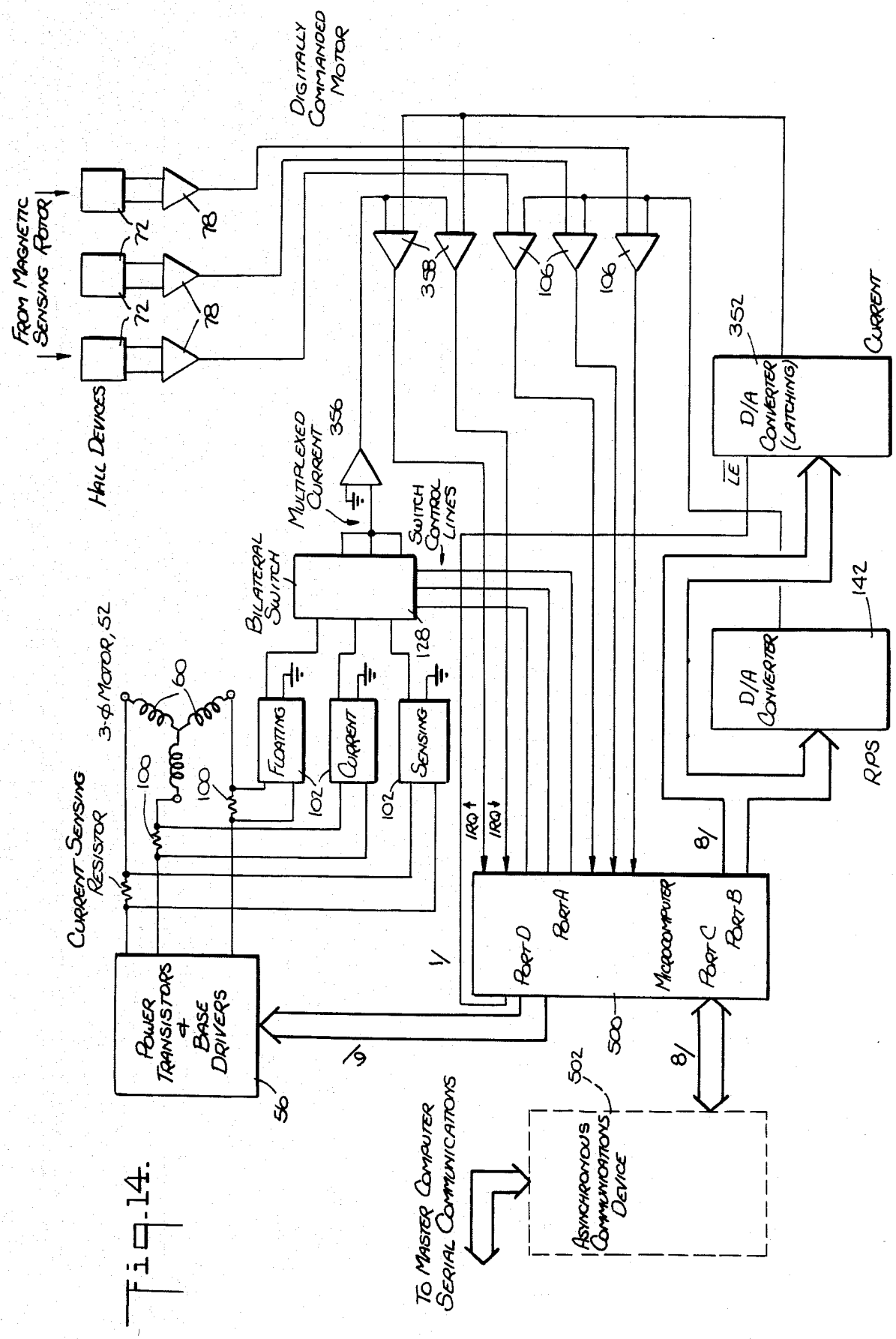
FIG. 14 is a functional block diagram of an electromechanical energy conversion system in accordance with the present invention implemented by means of a programmed digital microcomputer.

Referring now to FIG. 14 there is shown a motor 52, with three phase windings 60 connected to bridge circuit 56, comprising power transistors and base drivers. Each leg of the motor winding contains a current sensing resistor 100 which develops a voltage proportional to winding current. The voltages proportional to winding current are amplified in floating current sensors 102 and one voltage is selected by bilateral switch 128. The motor is equipped with position sensors comprising three Hall devices 72 and proportional amplifiers 78. Output signals from these amplifiers are as shown in FIG. 5. The multiplexed current signal from bilateral switch 128 is amplified by amplifier 356 and, together with the position signals from amplifiers 78, are compared with analog voltage levels from D/A converters 142 and 352 in comparators 358 and 106. The result of these comparisons is a set of five digital signals which are connected to microcomputer 500, which may, for example be an R6500/1 manufactured by Rockwell International. These signals indicate the status of the motor to the microcomputer.

Outputs from the microcomputer control bridge circuit 56 and D/A converters 142 and 352. Port C of the microcomputer connects the microcomputer to an asynchronous communications device which may be a Rockwell 6522. Through this device the microcomputer can receive external commands and send status information to the source of the commands. It will be appreciated that in the absence of a stored program this system will not operate. It will also be appreciated that the modes of operation of the system are limited only by capability of the microcomputer to detect the status of the motor and to switch power into the windings in response to external commands or internally generated commands. Thus, the most preferred embodiment of the invention disclosed in FIG. 14 is capable of all of the illustrative modes of operation previously described, as well as many others.

To illustrate how the system disclosed in FIG. 14 functions in one mode of operation, three subsidiary functions will first be described. These are commutation, pulse width modulation and speed measurement. Finally, a program combining these types of functions in a maximum power transfer mode will be described.

Referring to FIG. 5, the three Hall voltages H1, H2 and H3 define six 60 degree sectors by their zero crossings. A unique identification for each sector is created in the system of FIG. 14 at the output signals of comparators 106 when D/A converter 142 has its output set at the zero crossing level. To commutate the motor, the microcomputer sets a value on port B equal to the zero crossing and examines the state of inputs at port A. the three inputs to port A from comparators 106 are a Gray code representation of one of six sector numbers. Using this number as an entry to a table of six values, the proper state for bridge 56 is selected and appears at port D. When the Gray code indicating the sector number changes, another value in the table is selected and the state of the bridge 56 is altered. Thus, the motor is commutated as a function of the relative rotor/stator position as indicated by the Hall devices.

Control of winding current may be accomplished by a pulse width modulation technique which uses the multiplexed current developed by bilateral switch 128. Selection of the appropriate current sensor 102 is performed by outputs from port A of the microcomputer which are derived in the same manner as those controlling the state of bridge 56, i.e., from a look-up table addressed by the sector number. Thus, the analog current signal which represents actual winding current through the bridge appears at the output of amplifier 356. This signal is compared with the analog level of D/A converter 352 in comparators 358. These two comparators drive interrupt lines of the microcomputer, one of which is sensitive to an "OFF" state turning "ON", the other to an "ON" state turning "OFF". The desired upper current level is selected by the microcomputer and delivered to D/A converter 352 through port B. At the same time bridge 56 is energized through port D. Current in the motor then increases. When a signal from comparator 358 indicates that the upper limit has been reached, the microcomputer deenergizes the bridge and replaces the value in D/A converter 352 with the desired lower current level. Current in the motor now decreases until a signal from comparators 358 indicates that the lower limit has been reached. The computer replaces the value in D/A converter 352 with the desired upper current level and again energizes bridge 56. Thus, an average level for the motor current is fixed. This level may be adjusted by the microcomputer at any time in response to internal or external commands by varying the upper and lower current limits.

The signals from Hall devices 72 may also be used to measure the rotational speed of the motor. For example, the frequency of Hall voltage zero crossings may be counted for predetermined intervals of time. Alternatively, clock pulses may be counted between successive Hall voltage zero crossings. The former method is most useful at high speeds and the latter at low speeds. Both methods utilize the internal clock of the microcomputer.

Having shown how the essential functions commutation, pulse width modulation and speed measurement can be performed, the mode of power transfer maximization will now be illustrated in conjunction with the program listing included at the end of the specification. References to the listing are by line number and major program function. Statements 0103 through 0121 perform the commutation function and are designated subroutine "RUN". The RUN subroutine is invoked when a sector change is sensed by the subroutine "LOPFND" which comprises statements 0337 through 0340. The pulse width modulation subroutine comprises statements 0439 through 0451 and is designated "PWM". This subroutine operates with a constant frequency and a variable duty cycle because the operating point is easily adjusted directly by setting the pulse width modulation duty cycle. The speed measurement subroutine comprises statements 0124 through 0146 and is designated "SETIMR". This subroutine counts the fixed duration pulse width modulation cycles to measure the duration of a sector and stores the result for use in determining whether motor speed is increasing or decreasing. The remainder of the program is a maximum power transfer seeking algorithm which determines from successive sector durations whether motor speed is increasing or decreasing. The duty cycle is adjusted in that direction which results in a motor speed increase. This is generally known as a "hill-climbing" routine.

From the foregoing description it will be appreciated by those skilled in the art that a great many energy conversion modes of operation are possible with the simple hardware disclosed when used in conjunction with a stored program. These and other modes of operation may be combined with computing or communications functions so as to achieve highly flexible electromechanical energy conversion at low cost. As used herein, the expression electromechanical energy conversion embraces both electric power generation and utilization.

The present invention is not limited to the various modes of operation and energy conversion functions disclosed herein, but is limited only by the appended claims.

```
LINE # LOC      CODE           LINE 0002   0000
0003   0000                    ;9/12/79   HKK
0004   0000                    ;THIS PROGRAM CONTAINS AN ALGORITHM THAT
0005   0000                    ;OPTIMIZES MOTOR SPEED BY VARYING PWM DUTY
0006   0000                    ;CYCLE SO AS TO MAINTAIN OPTIMUM LOAD
0007   0000                    ;IMPEDANCE. THE ALGORITHM WILL SEARCH
0008   0000                    ;OUT THE MPPT POINT BY VARYING THE PWM DUTY
0009   0000                    ;CYCLE AND THEN MEASURING MOTOR SPEED TO
0010   0000                    ;DETERMINE WHETHER THE MOTOR SPEED INCREASED
0011   0000                    ;OR DECREASED.
0012   0000
0013   0000
0014   0000
0015   0000           *=$0000
0016   0000           SECTOR *=*+1
0017   0001           DIRFLG *=*+1
0018   0002           ONTIML *=*+1
0019   0003           ONTIMH *=*+1
```

```
0020  0004              OFTIML  *=*+1
0021  0005              OFTIMH  *=*+1
0022  0006              COUNTL  *=*+1
0023  0007              COUNTH  *=*+1
0024  0008              NCNTL   *=*+1
0025  0009              NCNTH   *=*+1
0026  000A              NTIML   *=*+1
0027  000B              NTIMH   *=*+1
0028  000C              PNCNTL  *=*+1
0029  000D              PNCNTH  *=*+1
0030  000E              NOWTML  *=*+1
0031  000F              NOWTMH  *=*+1
0032  0010              NOWCNT  *=*+1
0033  0011              TEMCNT  *=*+1
0034  0012              ONSGN   *=*+1
0035  0013              SIGN    *=*+1
0036  0014              FSIGN   *=*+1
0037  0015              OVRFLG  *=*+1
0038  0016              OFFLAG  *=*+1
0039  0017              WINOFF  *=*+1
0040  0018              POFTML  *=*+1
0041  0019              POFTMH  *=*+1
0042  001A              STCNTL  *=*+1
0043  001B              STCNTH  *=*+1
0044  001C              PNTLOW  *=*+1
0045  001D              PNTHGH  *=*+1
0046  001E              COUNTR  *=*+1
0047  001F              WINDRV  *=*+1
0048  0020              TEMP1   *=*+1
0049  0021              OUTPUT  =$83
0050  0021              INPUT   =$80
0051  0021              MDPNT   =$80
0052  0021              DAC     =$81
0053  0021              TRNOFF  =$FF
0054  0021              CNTROL  =$8F
0055  0021              THRONL  =$85
0056  0021              THRONH  =$88
0057  0021              RDTMRL  =$87
0058  0021              RDTMRH  =$86
0059  0021              TOTIML  =$97
0060  0021              TOTIMH  =$02
0061  0021              PWMOFF  =$2F
0062  0021              MASK    =$20
0063  0021
0064  0021                      *=$800
0065  0800  78          INITS   SEI             ;DISABLE INTERRUPTS
0066  0801  D8                  CLD
0067  0802  A2 3F               LDX #$3F
0068  0804  9A                  TXS             ;SET STACK POINTER AT TOP OF RAM
0069  0805  A9 FF               LDA #TRNOFF
0070  0807  85 83               STA OUTPUT      ;TURN OFF DRIVE TO WINDINGS
0071  0809  85 80               STA INPUT       ;SET UP INPUT PORT FOR RPS
0072  080B  A0 1F               LDY #CWINDRV    ;SET UP INDEX TO RAM TABLE
0073  080D  BE 00 0F    LDRAM   LDX VARBLE,Y    ;LOAD VARIABLE FROM PROGRAM TABLE
0074  0810  96 00               STX SECTOR,Y    ;STORE VARIABLE IN RAM, ZERO PAGE
0075  0812  88                  DEY             ;DECREMENT COUNTER
```

```
0076  0213  10 F8           BPL LDRAM       ;IF Y=>0, BRANCH BACK
0077  0215  A9 10           LDA #$10
0078  0217  85 8F           STA CNTROL      ;SET UP CONTROL REGISTER FOR TIMER INTERRUPTS
0079  0219  18              CLC
0080  021A  A9 E0           LDA #$E0        ;MASK FOR INPUT PORT SENSING
0081  021C  25 80           AND INPUT
0082  021E  2A              ROL A
0083  021F  2A              ROL A
0084  0220  2A              ROL A
0085  0221  2A              ROL A           ;ROTATE ACC. THROUGH CARRY 4 TIMES
0086  0222  AA              TAX             ;ACC. INTO X REG.
0087  0223  BD 20 0F        LDA SCTBLE,X    ;FETCH SECTOR VALUE
0088  0226  C9 06           CMP #$06
0089  0228  90 03           BCC VALRPS
0090  022A  4C F3 0F        JMP STPMTR
0091  022D  85 00    VALRPS STA SECTOR
0092  022F  AA              TAX
0093  0230  BD 28 0F        LDA STATE,X     ;FETCH DRIVE STATE FOR THIS SECTOR
0094  0233  85 1F           STA WINDRV
0095  0235  BD 34 0F        LDA OFSTAT,X    ;FETCH TURN OFF STATE FOR THIS SECTOR
0096  0238  85 17           STA WINOFF
0097  023A  A9 01           LDA #$01
0098  023C  85 85           STA TMRONL      ;SET UP TIMER FOR IMMEDIATE INTERRUPT
0099  023E  A9 00           LDA #$00
0100  0240  85 88           STA TMRONH
0101  0242  58              CLI             ;ENABLE INTERRUPTS
0102  0243  4C E1 09        JMP LOPFND      ;JUMP TO SECTOR SENSING
0103  0246  A5 87    RUN    LDA RDTMRL      ;READ LOWER COUNT AND RESET
0104  0248                                  ;OVERFLOW BIT
0105  0248  78              SEI             ;DISABLE INTERRUPTS
0106  0249  85 06           STA COUNTL      ;STORE LOWER BYTE OF COUNTER
0107  024B  A5 86           LDA RDTMRH      ;READ UPPER COUNTER AND STORE
0108  024D  85 07           STA COUNTH
0109  024F  A4 00           LDY SECTOR      ;SECTOR INTO INDEX
0110  0251  B9 28 0F        LDA STATE,Y     ;FETCH DRIVE STATE FOR NEW SECTOR
0111  0254  85 1F           STA WINDRV      ;STORE NEW DRIVE STATE
0112  0256  B9 34 0F        LDA OFSTAT,Y    ;FETCH DRIVE STATE FOR CIRCULATING
0113  0259                                  ;CURRENT AND PWM OFF
0114  0259  85 17           STA WINOFF      ;STORE IN RAM
0115  025B  A5 12           LDA ONSGN       ;STORE ONSGN VALUE FOR CALCULATING
0116  025D                                  ;SECTOR TRANSITION TIME
0117  025D  85 13           STA SIGN
0118  025F  F0 07           BEQ OFPHAS      ;IF ONSGN = 0, THEN DRIVE IS OFF, BRANCH
0119  0261  A5 1F           LDA WINDRV      ;FETCH NEW DRIVE STATE. THIS IS ON STATE
0120  0263  85 83           STA OUTPUT      ;SET NEW STATE ON DRIVE PORT.
0121  0265  4C 6C 08        JMP SETIMR
0122  0268  A5 17    OFPHAS LDA WINOFF      ;LOAD OFF STATE FOR DRIVE
0123  026A  85 83           STA OUTPUT
0124  026C  A5 11    SETIMR LDA TEMCNT      ;FETCH AND STORE COUNT OF PWM
0125  026E                                  ;CYCLES FROM PREVIOUS SECTOR
0126  026E  85 10           STA NOWCNT
0127  0270  A9 00           LDA #$00
0128  0272  85 11           STA TEMCNT      ;RESET COUNT OF PWM CYCLES FOR NEXT SECTOR
0129  0274  A5 06           LDA COUNTL
0130  0276  85 85           STA TMRONL      ;SET LOWER TIMER LATCH
0131  0278  A5 07           LDA COUNTH
0132  027A  85 88           STA TMRONH      ;SET TIMER UPPER LATCH AND INITIALIZE
```

```
0133  087C  58           CLI                  ;ENABLE INTERRUPTS
0134  087D  A5 13        LDA SIGN
0135  087F  F0 10        BEQ SIGN0            ;IF SIGN = 0, BRANCH AND SUBTRACT COUNT
0136  0881                                    ;FROM OFTIM
0137  0881  A5 02        LDA ONTIML           ;SIGN = 1, SO SUBTRACT COUNT FROM
0138  0883                                    ;ONTIM
0139  0883  38           SEC                  ;SET CARRY
0140  0884  E5 06        SBC COUNTL           ;THIS GIVES ME WHAT HAD
0141  0886                                    ;RUN OFF THE TIMER WHEN THE END OF
0142  0886                                    ;THE SECTOR WAS REACHED.
0143  0886  85 0E        STA NOWTML           ;STORE RESULT
0144  0888  A5 03        LDA ONTIMH
0145  088A  E5 07        SBC COUNTH           ;UPPER BYTE SUBTRACTION
0146  088C  85 0F        STA NOWTMH           ;STORE RESULT
0147  088E  4C 9E 08     JMP SIGN1            ;JUMP AROUND SIGN0
0148  0891  A9 97   SIGN0 LDA #TOTIML         ;SUBTRACT COUNT FROM TIME FOR
0149  0893                                    ;TOTAL PWM CYCLE TIME
0150  0893  38           SEC
0151  0894  E5 06        SBC COUNTL           ;SUBTRACT LOWER BYTE
0152  0896  85 0E        STA NOWTML           ;STORE RESULT
0153  0898  A9 02        LDA #TOTIMH
0154  089A  E5 07        SBC COUNTH           ;SUBTRACT UPPER BYTE
0155  089C  85 0F        STA NOWTMH           ;STORE UPPER BYTE OF RESULT
0156  089E  A5 14   SIGN1 LDA FSIGN           ;LOAD INDICATOR FOR FIRST PWM
0157  08A0                                    ;HALF CYCLE OF PREVIOUS SECTOR
0158  08A0  F0 28        BEQ FSIGN0           ;IF THIS VALUE IS 0, BRANCH AND
0159  08A2                                    ;ADD PREVIOUS SECTOR'S OFTIM TO NOWTIM
0160  08A2  A5 18        LDA POFTML           ;ADD PREVIOUS SECTOR'S OFTIM TO
0161  08A4                                    ;THE COUNT AT THE BEGINNING OF THE SECTOR
0162  08A4  18           CLC
0163  08A5  65 1A        ADC STCNTL
0164  08A7  85 1A        STA STCNTL
0165  08A9  A5 19        LDA POFTMH
0166  08AB  65 1B        ADC STCNTH
0167  08AD  85 1B        STA STCNTH           ;STORE RESULT IN STCNT
0168  08AF  A5 0E        LDA NOWTML           ;ADD STCNT TO NOWTIM
0169  08B1  18           CLC
0170  08B2  65 1A        ADC STCNTL
0171  08B4  85 0E        STA NOWTML           ;STORE RESULT IN NOWTIM
0172  08B6  A5 0F        LDA NOWTMH
0173  08B8  65 1B        ADC STCNTH
0174  08BA  85 0F        STA NOWTMH           ;UPPER BYTE STORED
0175  08BC  A9 2F        LDA #PWMOFF          ;ADD TO THIS TOTAL THE TIME NEEDED
0176  08BE                                    ;TO SERVICE A PWM TURNOFF
0177  08BE  18           CLC
0178  08BF  65 0E        ADC NOWTML
0179  08C1  85 0E        STA NOWTML
0180  08C3  90 12        BCC READY            ;IF CARRY CLEARED, BRANCH
0181  08C5  E6 0F        INC NOWTMH
0182  08C7  4C D7 08     JMP READY
0183  08CA  A5 1A   FSIGN0 LDA STCNTL
0184  08CC  18           CLC
0185  08CD  65 0E        ADC NOWTML           ;ADD PREVIOUS SECTOR OFF TIME TO
0186  08CF                                    ;NOWTIM TO ADJUST FOR BEGINNING
0187  08CF  85 0E        STA NOWTML           ;STORE RESULT
0188  08D1  A5 1B        LDA STCNTH
0189  08D3  65 0F        ADC NOWTMH
```

```
0190  08D5  85 0F              STA NOWTMH    ;ADJUSTED VALUE OF NOWTIM
0191  08D7  A5 13       REARR  LDA SIGN      ;FETCH AND STORE NEW SIGN IN FSIGN
0192  08D9  85 14              STA FSIGN
0193  08DB  A5 04              LDA OFTIML    ;FETCH AND STORE OFTIM IN POFTM
0194  08DD  85 18              STA POFTML
0195  08DF  A5 05              LDA OFTIMH
0196  08E1  85 19              STA POFTMH    ;FETCH AND STORE UPPER BYTE
0197  08E3  A5 06              LDA COUNTL    ;FETCH AND STORE COUNT IN STCNT
0198  08E5  85 1A              STA STCNTL
0199  08E7  A5 07              LDA COUNTH
0200  08E9  85 1B              STA STCNTH    ;FETCH AND STORE UPPER BYTE
0201  08EB  A5 0E       ADJUST LDA NOWTML    ;SUBTRACT THE TOTAL TIME FOR A PWM
0202  08ED                                   ;CYCLE TO SEE IF NOWCNT SHOULD BE
0203  08ED                                   ;INCREMENTED
0204  08ED  38                 SEC
0205  08EE  E9 97              SBC #TOTIML
0206  08F0  85 20              STA TEMP1     ;STORE RESULT IN TEMPORARY REGISTER
0207  08F2  A5 0F              LDA NOWTMH    ;16 BIT SUBTRACTION - HIGH BYTE
0208  08F4  E9 02              SBC #TOTIMH
0209  08F6  90 0E              BCC SAVIT     ;IF NOWTIM > TOTIM, INCREMENT NOWCNT
0210  08F8                                   ;AND STORE DIFFERENCE AS NOWTIM
0211  08F8                                   ;IF NOWTIM < TOTIM, BRANCH ON
0212  08F8  85 0F              STA NOWTMH    ;SAVE NEW UPPER BYTE OF NOWTIM
0213  08FA  A5 20              LDA TEMP1
0214  08FC  85 0E              STA NOWTML    ;LOWER BYTE
0215  08FE  E6 10              INC NOWCNT    ;INCREMENT NO. OF PWM CYCLES FOR LAST SECTOR
0216  0900  D0 04              BNE SAVIT     ;IF NOWCNT /= 00, BRANCH
0217  0902  A9 01              LDA #$01
0218  0904  85 15              STA OFFLAG    ;SET OFFLAG = 1 IF NOWCNT = 00
0219  0906  A5 15       SAVIT  LDA OFFLAG    ;TEST TO DETERMINE IF THE MOTOR IS
0220  0908                                   ;RUNNING VERY SLOW
0221  0908  F0 07              BEQ GETIT
0222  090A  A9 01              LDA #$01
0223  090C  85 01              STA DIRFLG    ;SET DIRFLG
0224  090E  4C 72 09           JMP INPWM
0225  0911  A5 08       GETIT  LDA NCNTL     ;SINCE THE MOTOR IS NOT GOING SLOWER
0226  0913                                   ;SLOWER THAN THE MINIMUM SPEED, ADD NOWCNT TO NCNT
0227  0913  18                 CLC
0228  0914  65 10              ADC NOWCNT
0229  0916  85 08              STA NCNTL
0230  0918  90 02              BCC CARCLR    ;CARRY CLEARED, BRANCH
0231  091A  E6 09              INC NCNTH     ;INCREMENT NCNT HIGH
0232  091C  A5 0E       CARCLR LDA NOWTML
0233  091E  18                 CLC
0234  091F  65 0A              ADC NTIML
0235  0921  85 0A              STA NTIML
0236  0923  A5 0F              LDA NOWTMH
0237  0925  65 0B              ADC NTIMH     ;ADD NTIM TO NOWTIM
0238  0927  85 0B              STA NTIMH
0239  0929  A5 0A              LDA NTIML
0240  092B  38                 SEC
0241  092C  E9 97              SBC #TOTIML
0242  092E  85 20              STA TEMP1
0243  0930  A5 0B              LDA NTIMH
0244  0932  E9 02              SBC #TOTIMH
0245  0934  90 11              BCC SAVIT2
0246  0936  85 0B              STA NTIMH
```

```
0247  0938  A5 20          LDA TEMP1
0248  093A  85 0A          STA NTIML
0249  093C  18             CLC
0250  093D  A5 08          LDA NCNTL
0251  093F  69 01          ADC #$01
0252  0941  85 08          STA NCNTL
0253  0943  90 02          BCC SAVIT2
0254  0945  E6 09          INC NCNTH          ;THE PURPOSE OF THIS SECTION WAS TO ADD
0255  0947                                    ;NOWCNT AND NCNT AND TIMES AND ADJUST THESE VALUES
0256  0947  C6 1E   SAVIT2 DEC COUNTR         ;DECREMENT SECTOR COUNT REGISTER
0257  0949  F0 03          BEQ BABY
0258  094B  4C DB 09       JMP BFRLOP
0259  094E  A5 0D   BABY   LDA PNCNTH
0260  0950  C5 09          CMP NCNTH          ;COMPARE NCNT WITH PREVIOUS NCNT
0261  0952  90 0F          BCC DESPED         ;GOING SLOWER, BRANCH
0262  0954  D0 06          BNE INSPED         ;GOING FASTER, BRANCH
0263  0956  A5 0C          LDA PNCNTL
0264  0958  C5 08          CMP NCNTL
0265  095A  90 07          BCC DESPED
0266  095C  A5 01   INSPED LDA DIRFLG         ;TEST TO SEE IF PREVIOUS CHANGE IN PWM WAS
0267  095E                                    ;UP OR DOWN. GOING IN RIGHT DIRECTION.
0268  095E  D0 12          BNE INPWM          ;INCREASE PWM ON TIME
0269  0960  4C 97 09       JMP DEPWM          ;DECREASE PWM ON TIME
0270  0963  A5 01   DESPED LDA DIRFLG
0271  0965  F0 07          BEQ STFLG1         ;IF DIRFLG SHOWS THAT PREVIOUS CHANGE WAS
0272  0967                                    ;DOWN, THEN SET FLAG AND INCREASE ON TIME
0273  0967  A9 00          LDA #$00
0274  0969  85 01          STA DIRFLG         ;SET DIRECTION FLAG = 00. DECREASE ON TIME
0275  096B  4C 97 09       JMP DEPWM
0276  096E  A9 01   STFLG1 LDA #$01
0277  0970  85 01          STA DIRFLG         ;SET DIRECTION FLAG = 1. INCREASE ON TIME
0278  0972  A5 02   INPWM  LDA ONTIML         ;TEST TO SEE IF PWM IS MAX ALREADY
0279  0974  C9 12          CMP #$12
0280  0976  D0 06          BNE NOTMAX         ;IF NOT, BRANCH
0281  0978  A5 03          LDA ONTIMH
0282  097A  C9 02          CMP #$02
0283  097C  F0 38          BEQ BFRBFR         ;IF PWM MAX ALREADY, BRANCH TO SECTOR SENSING
0284  097E  A5 02   NOTMAX LDA ONTIML
0285  0980  18             CLC
0286  0981  69 05          ADC #$05           ;INCREASE PWM DUTY CYCLE BY ADDING 5
0287  0983                                    ;TO ONTIM AND SUBTRACTING 5 FROM OFTIM
0288  0983  85 02          STA ONTIML
0289  0985  90 02          BCC SMADD
0290  0987  E6 03          INC ONTIMH
0291  0989  A5 04   SMADD  LDA OFTIML
0292  098B  38             SEC
0293  098C  E9 05          SBC #$05           ;SUBTRACT 5 FROM OFTIM
0294  098E  85 04          STA OFTIML
0295  0990  B0 02          BCS SMSUB
0296  0992  C6 05          DEC OFTIMH
0297  0994  4C E9 09 SMSUB JMP BFRBFR
0298  0997  A5 04   DEPWM  LDA OFTIML
0299  0999  C9 12          CMP #$12
0300  099B  D0 06          BNE NTMAX          ;CHECK TO SEE IF PWM IS AT MIN DUTY CYCLE ALREADY
0301  099D  A5 05          LDA OFTIMH
0302  099F  C9 02          CMP #$02
```

```
0303  09A1  F0 16              BEQ BFRBFR
0304  09A3  A5 04        NTMAX LDA OFTIML       ;DECREASE PWM CYCLE BY ADDING 5 TO
0305  09A5                                      ;OFTIM AND SUBTRACTING 5 FROM ONTIM
0306  09A5  18                 CLC
0307  09A6  69 05              ADC #$05
0308  09A8  85 04              STA OFTIML       ;STORE RESULT
0309  09AA  90 02              BCC SADD         ;IF CARRY IS NOT GENERATED, BRANCH
0310  09AC  E6 05              INC OFTIMH       ;INCREMENT IF CARRY SET
0311  09AE  A5 02        SADD  LDA ONTIML       ;DECREASE ONTIM
0312  09B0  38                 SEC
0313  09B1  E9 05              SBC #$05
0314  09B3  85 02              STA ONTIML
0315  09B5  B0 02              BCS BFRBFR       ;IF CARRY NOT CLEARED, BRANCH
0316  09B7  C6 03              DEC ONTIMH       ;CARRY CLEARED, DEC ONTIMH
0317  09B9  A9 24        BFRBFR LDA #$24
0318  09BB  85 1E              STA COUNTR
0319  09BD  A5 16              LDA OFFLAG
0320  09BF  D0 08              BNE OFSET        ;IF OFFLAG IS SET, BRANCH
0321  09C1  A5 09              LDA NCNTH
0322  09C3  85 0D              STA PNCNTH       ;TRANSFER VARIABLES
0323  09C5  A5 08              LDA NCNTL
0324  09C7  85 0C              STA PNCNTL
0325  09C9  A9 00        OFSET LDA #$00
0326  09CB  85 09              STA NCNTH        ;RESET VARIABLES
0327  09CD  85 08              STA NCNTL
0328  09CF  85 0B              STA NTIMH
0329  09D1  85 0A              STA NTIML
0330  09D3  A5 16              LDA OFFLAG
0331  09D5  F0 04              BEQ BFRLOP
0332  09D7  A9 FF              LDA #$FF
0333  09D9  85 0D              STA PNCNTH
0334  09DB  A9 00        BFRLOP LDA #$00
0335  09DD  85 15              STA OVRFLO       ;RESET OVERFLOW FLAG
0336  09DF  85 16              STA OFFLAG
0337  09E1  A4 08        LOPFND LDY SECTOR
0338  09E3  B9 2E 0F           LDA LOPADL,Y    ;FETCH ADDRESS FOR SECTOR
0339  09E6  85 1C              STA PNTLOW       ;STORE INDEX IN RAM FOR INDIRECT JUMP
0340  09E8  6C 1C 00           JMP (PNTLOW)
0341  09EB                     *=$0A00
0342  0A00  A5 15        LOOP0 LDA OVRFLO       ;TEST OVERFLOW BIT TO SEE IF MOTOR IS
0343  0A02                                      ;NOT TURNING OR TURNING VERY SLOW
0344  0A02  F0 03              BEQ ON0          ;IF RESET, GO ON
0345  0A04  4C 68 0A           JMP SECDET       ;JUMP TO SECTOR MAKE SURE ROUTINE
0346  0A07  24 80        ON0   BIT INPUT        ;TEST PORT
0347  0A09  10 4D              BPL DECSEC
0348  0A0B  4C 00 0A           JMP LOOP0
0349  0A0E  A5 15        LOOP1 LDA OVRFLO
0350  0A10  F0 03              BEQ ON1
0351  0A12  4C 68 0A           JMP SECDET
0352  0A15  24 80        ON1   BIT INPUT
0353  0A17  50 3F              BVC DECSEC
0354  0A19  4C 0E 0A           JMP LOOP1
0355  0A1C  A5 15        LOOP2 LDA OVRFLO
0356  0A1E  F0 03              BEQ ON2
0357  0A20  4C 68 0A           JMP SECDET
0358  0A23  A9 20        ON2   LDA #MASK
0359  0A25  24 80              BIT INPUT
```

```
0360  0A27  F0 2F              BEQ DECSEC
0361  0A29  4C 10 0A           JMP LOOP2
0362  0A2C  A5 15     LOOP3    LDA OVRFLO
0363  0A2E  F0 03              BEQ ON3
0364  0A30  4C 68 0A           JMP SECDET
0365  0A33  24 80     ON3      BIT INPUT
0366  0A35  30 21              BMI DECSEC
0367  0A37  4C 2C 0A           JMP LOOP3
0368  0A3A  A5 15     LOOP4    LDA OVRFLO
0369  0A3C  F0 03              BEQ ON4
0370  0A3E  4C 68 0A           JMP SECDET
0371  0A41  24 80     ON4      BIT INPUT
0372  0A43  70 13              BVS DECSEC
0373  0A45  4C 3A 0A           JMP LOOP4
0374  0A48  A5 15     LOOP5    LDA OVRFLO
0375  0A4A  F0 03              BEQ ON5
0376  0A4C  4C 68 0A           JMP SECDET
0377  0A4F  A9 20     ON5      LDA #MASK
0378  0A51  24 80              BIT INPUT
0379  0A53  D0 03              BNE DECSEC
0380  0A55  4C 48 0A           JMP LOOP5
0381  0A58  A5 00     DECSEC   LDA SECTOR    ;ROUTINE TO INCREMENT SECTOR COUNT
0382  0A5A  F0 05              BEQ SEC0      ;IF SECTOR = 0, BRANCH
0383  0A5C  C6 00              DEC SECTOR
0384  0A5E  4C 46 08           JMP RUN       ;JUMP BACK TO START OF RUN ROUTINE
0385  0A61  A9 05     SEC0     LDA #$05
0386  0A63  85 00              STA SECTOR    ;SET SECTOR TO 0
0387  0A65  4C 46 08           JMP RUN
0388  0A68  18        SECDET   CLC
0389  0A69  A9 E0              LDA #$E0
0390  0A6B  25 80              AND INPUT     ;MASK INPUT PORT
0391  0A6D  2A                 ROL A         ;ROTATE LEFT 4 TIMES
0392  0A6E  2A                 ROL A
0393  0A6F  2A                 ROL A
0394  0A70  2A                 ROL A
0395  0A71  AA                 TAX           ;ACC. INTO X REGISTER
0396  0A72  BD 28 0F           LDA SCTBLE,X
0397  0A75  C9 06              CMP #$06
0398  0A77  90 03              BCC VALPS
0399  0A79  4C F3 0F           JMP STPMTR
0400  0A7C  C5 00     VALPS    CMP SECTOR    ;COMPARE THIS TO SECTOR TO SEE IF CURRENT
0401  0A7E                                   ;SECTOR IS CORRECT
0402  0A7E  F0 18              BEQ SECRIT    ;IF THE SAME, BRANCH AND INCREASE DRIVE
0403  0A80  85 00              STA SECTOR
0404  0A82  AA                 TAX           ;ACC. INTO X REG.
0405  0A83  BD 28 0F           LDA STATE,X
0406  0A86  85 1F              STA WINDRV    ;SET NEW DRIVE
0407  0A88  BD 34 0F           LDA OFSTAT,X
0408  0A8B  85 17              STA WINOFF
0409  0A8D  A9 01              LDA #$01
0410  0A8F  85 16              STA OFFLAG    ;SET OFFLAG = 1
0411  0A91  A9 00              LDA #$00
0412  0A93  85 15              STA OVRFLO    ;RESET OVERFLOW FLAG
0413  0A95  4C E1 09           JMP LOPFND    ;GO BACK TO LOOP SENSING
0414  0A98  A5 02     SECRIT   LDA ONTIML    ;ROUTINE TO INCREASE DRIVE
0415  0A9A  C9 12              CMP #$12
0416  0A9C  D0 06              BNE NOMAX
```

```
0417  0A9E  A5 03              LDA ONTIMH
0418  0AA0  C9 02              CMP #$02
0419  0AA2  F0 16              BEQ SETFLO
0420  0AA4  A5 02       NOMAX  LDA ONTIML
0421  0AA6  18                 CLC
0422  0AA7  69 05              ADC #$05
0423  0AA9  85 02              STA ONTIML
0424  0AAB  90 02              BCC SLICK
0425  0AAD  EE 03              INC ONTIMH
0426  0AAF  A5 04       SLICK  LDA OFTIML
0427  0AB1  38                 SEC
0428  0AB2  E9 05              SBC #$05
0429  0AB4  85 04              STA OFTIML
0430  0AB6  B0 02              BCS SETFLO
0431  0AB8  C6 05              DEC OFTIMH
0432  0ABA  A9 00       SETFLO LDA #$00
0433  0ABC  85 15              STA OVRFLO
0434  0ABE  A9 01              LDA #$01
0435  0AC0  85 16              STA OFFLAG
0436  0AC2  4C E1 09           JMP LOPFND
0437  0AC5                                   ;THIS IS A TIMER INTERRUPT ROUTINE
0438  0AC5                                   ;TO MODULATE PWM FOR THE DRIVE
0439  0AC5  48          PWM    PHA           ;SAVE ACCUMULATOR
0440  0AC6  A5 12              LDA ONSGN     ;TEST FLAG TO DETERMINE IF ON OR OFF
0441  0AC8  F0 12              BEQ ONPHAS    ;IF FLAG 0, BRANCH
0442  0ACA  A9 00              LDA #$00
0443  0ACC  85 12              STA ONSGN     ;RESET FLAG
0444  0ACE  A5 17              LDA WINOFF
0445  0AD0  85 83              STA OUTPUT    ;TURN OFF DRIVE TO WINDINGS. LET CURRENT IDLE
0446  0AD2  A5 04              LDA OFTIML
0447  0AD4  85 85              STA TMRONL
0448  0AD6  A5 05              LDA OFTIMH
0449  0AD8  85 88              STA TMRONH    ;RESET TIMER
0450  0ADA  68                 PLA
0451  0ADB  40                 RTI           ;RETURN FROM INTERRUPT
0452  0ADC  A9 01       ONPHAS LDA #$01
0453  0ADE  85 12              STA ONSGN
0454  0AE0  A5 1F              LDA WINDRV
0455  0AE2  85 83              STA OUTPUT    ;TURN ON DRIVE TO WINDINGS
0456  0AE4  E6 11              INC TEMCNT    ;INCREMENT COUNT OF PWM CYCLES
0457  0AE6  D0 04              BNE NTOFLO    ;IF TEMCNT = 0, BRANCH
0458  0AE8  A9 01              LDA #$01
0459  0AEA  85 15              STA OVRFLO    ;SET FLAG TO 1 TO INDICATE THAT PWM COUNT
0460  0AEC                                   ;IS GREATER THAN 256
0461  0AEC  A5 02       NTOFLO LDA ONTIML
0462  0AEE  85 85              STA TMRONL
0463  0AF0  A5 03              LDA ONTIMH
0464  0AF2  85 88              STA TMRONH
0465  0AF4  68                 PLA
0466  0AF5  40                 RTI
0467  0AF6                     *=$0F00
0468  0F00  00          VARBLE .BYT $00,$01,$1E,$00,$12,$02,$00,$00,$00
0468  0F01  01
0468  0F02  1E
0468  0F03  00
0468  0F04  12
0468  0F05  02
```

```
0468  0F06  00
0468  0F07  00
0468  0F08  00
0469  0F09  00                .BYT $00,$00,$00,$00,$FF,$00,$00,$00,$00,$00
0469  0F0A  00
0469  0F0B  00
0469  0F0C  00
0469  0F0D  FF
0469  0F0E  00
0469  0F0F  00
0469  0F10  00
0469  0F11  00
0469  0F12  00
0470  0F13  00                .BYT $00,$01,$00,$01,$FF,$50,$00,$50
0470  0F14  01
0470  0F15  00
0470  0F16  01
0470  0F17  FF
0470  0F18  50
0470  0F19  00
0470  0F1A  50
0471  0F1B  00                .BYT $00,$00,$0A,$24,$FF
0471  0F1C  00
0471  0F1D  0A
0471  0F1E  24
0471  0F1F  FF
0472  0F20  05      SCTBLE    .BYT $05,$04,$FF,$03,$00,$FF,$01,$02
0472  0F21  04
0472  0F22  FF
0472  0F23  03
0472  0F24  00
0472  0F25  FF
0472  0F26  01
0472  0F27  02
0473  0F28  DE      STATE     .BYT $DE,$DD,$F5,$F3,$EB,$EE
0473  0F29  DD
0473  0F2A  F5
0473  0F2B  F3
0473  0F2C  EB
0473  0F2D  EE
0474  0F2E  00      LPADL     .BYT <LOOP0,<LOOP1,<LOOP2,<LOOP3,<LOOP4,<LOOP5
0474  0F2F  0E
0474  0F30  1C
0474  0F31  2C
0474  0F32  3A
0474  0F33  48
0475  0F34  DF      OFSTAT    .BYT $DF,$FD,$F7,$FB,$EF,$FE
0475  0F35  FD
0475  0F36  F7
0475  0F37  FB
0475  0F38  EF
0475  0F39  FE
0476  0F3A                    *=$0FF3
0477  0FF3  78      STPMTR SEI           ;DISABLE INTERRUPTS
0478  0FF4  A9 FF          LDA #$FF
0479  0FF6  85 83          STA OUTPUT
0480  0FF8  EA      LOOPIN NOP
```

```
0481  0FF9  4C F8 0F         JMP LOOPIN
0482  0FFC  F3               .BYT <STPMTR,>STPMTR,<PWM,>PWM
0482  0FFD  0F
0482  0FFE  C5
0482  0FFF  0A
0483  1000                   .END
```

ERRORS = 0000 (0000)

SYMBOL TABLE

SYMBOL   VALUE

| | | | | | | | | | |
|---|---|---|---|---|---|---|---|---|---|
| ADJUST | 09EB | BABY | 094E | EFRBFR | 09E9 | EFRLUP | 09DB |
| CHRCLR | 091C | CNTROL | 008F | COUNTH | 0007 | COUNTL | 0006 |
| COUNTR | 001E | DAC | 0081 | DECSEC | 0A58 | DEPWM | 0997 |
| DESPED | 0963 | DIRFLG | 0001 | FSIGN | 0014 | FSIGN0 | 0ACA |
| GETIT | 0911 | INITS | 0800 | INPUT | 0080 | INPWM | 0972 |
| INSPED | 095C | LDRAM | 0800 | LOOP0 | 0A00 | LOOP1 | 0A0E |
| LOOP2 | 0A1C | LOOP3 | 0A2C | LOOP4 | 0A3A | LOOP5 | 0A48 |
| LOOPIN | 0FF8 | LOPADL | 0F2E | LOFFRO | 09E1 | MASK | 0020 |
| MDPNT | 0088 | NCNTH | 0009 | NCNTL | 0008 | NOMAX | 09A4 |
| NOTMAX | 097E | NOWCNT | 0010 | NOWTMH | 000F | NOWTML | 000E |
| NTIMH | 000B | NTIML | 000A | NTMAX | 09A3 | NTOFLO | 0AEC |
| OFFLAG | 0016 | OFPHAS | 0868 | OFSET | 09C9 | OFSTRT | 0F34 |
| OFTIMH | 0005 | OFTIML | 0004 | ON0 | 0A07 | ON1 | 0A15 |
| ON2 | 0A23 | ON3 | 0A33 | ON4 | 0A41 | ON5 | 0A4F |
| ONPHAS | 0ADC | ONSGN | 0012 | ONTIMH | 0003 | ONTIML | 0002 |
| OUTPUT | 0083 | OVRFLO | 0015 | PNCNTH | 000D | PNCNTL | 000C |
| PNTHGH | 001D | PNTLOW | 001C | POFTMH | 0019 | POFTML | 0018 |
| PWM | 0AC5 | PWMOFF | 002F | RDTMRH | 0086 | RDTMRL | 0087 |
| READY | 08D7 | RUN | 0A46 | SADD | 09AE | SAVIT | 0906 |
| SAVIT2 | 0947 | SCTBLE | 0F20 | SEC0 | 0A61 | SECDET | 0A68 |
| SECRIT | 0A98 | SECTOR | 0000 | SETFLO | 0ABA | SETIMR | 086C |
| SIGN | 0013 | SIGN0 | 0891 | SIGN1 | 089E | SLICK | 0AAF |
| SMADD | 0989 | SMSUB | 0994 | STATE | 0F28 | STCNTH | 001B |
| STCNTL | 001A | STFLG1 | 096E | STPMTR | 0FF3 | TEMCNT | 0011 |
| TEMP1 | 0020 | TMRONH | 0088 | TMRONL | 0085 | TOTIMH | 0002 |
| TOTIML | 0097 | TRNOFF | 00FF | VALPS | 0A7C | VALRPS | 082D |
| VARBLE | 0F00 | WINDRV | 001F | WINOFF | 0017 | | |

END OF ASSEMBLY

We claim:

1. A motor control system comprising:
   a brushless electric machine having field and wound members movable relative to each other, said wound member having a plurality of energizable windings;
   a position sensor associated with said motor to provide a position indication of relative position of said field and wound members;
   switching means associated with said motor for measuring a controllable parameter of the motor operation;
   a switching array including a plurality of solid state switching devices connected to selectively energize said windings;
   a programmable microprocessor operatively connected to receive said position indications and said measured controllable parameter and to control said switching array; and
   said microprocessor being programmed to determine the instantaneous on/off state for each of said switching devices
   to energize said windings at a predetermined pulse energy level determined according to said measured controllable parameter, and
   to commutate said winding energization according to said position indications.

2. A motor control system according to claim 1 wherein said programmable microprocessor is programmable to operate in at least two different active modes.

3. A motor control system according to claim 1 further including:
   current sensing means for sensing the current flow to a winding being energized,
   wherein said microprocessor is programmed to calculate a high value and a low value for current flow to said winding and
   to turn on one of said switching devices when said sensed current flow is below said high value, and to turn off said switching device in the "on" state when said sensed current flow falls below said low value.

4. A motor control system according to claim 1 wherein said position indications and said measured controllable parameter are derived from Hall sensors associated with said motor.

5. An electromechanical energy conversion system comprising:
   a brushless motor having a rotor and a stator having a plurality of energizeable windings;
   sensors associated with said motor for sensing the relative position of said rotor and stator and for producing a sector signal indicative of the sector in which a rotor pole is located and a sector change signal when a rotor pole moves from one sector to another;
   switching circuitry connected to said windings for controlling the flow of current therethrough;
   means for measuring the rotor velocity; and
   control means connected to said sensors, said means for measuring rotor velocity and said switching circuitry, said control means comprising a current modulator for comparing the measured rotor velocity with a commanded rotor velocity and for producing a current command signal for energizing windings when winding currents fall below a first value and for deenergizing windings when winding currents exceed a second value, and a logic array for controlling said switching circuitry in accordance with said sector and current command signals so as to maintain the measured rotor velocity approximately equal to the commanded rotor velocity.

6. An electromechanical energy conversion system according to claim 5 wherein said means for measuring the rotor velocity comprises means for counting sector change signals for a predetermined time.

7. An electromechanical energy conversion system according to claim 5 wherein said means for measuring the rotor velocity comprises means for counting clock pulses occurring between sector change signals.

8. An electromechanical conversion system comprising:
   a brushless motor having a rotor and a stator having a plurality of energizeable windings;
   sensors associated with said motor for sensing the relative position of said rotor and stator and for producing a sector signal indicative of the sector in which a rotor pole is located;
   switching circuitry connected to said windings for controlling the flow of current therethrough;
   means for measuring the rotor position; and
   control means connected to said sensors, said means for measuring rotor position and said switching circuitry, said control means comprising a current modulator for comparing the measured rotor position with a commanded rotor position and for producing a current command signal for energizing windings when winding currents fall below a first value and for deenergizing windings when winding currents exceed a second value, and a logic array for controlling said switching circuitry in accordance with said sector and current command signals so as to maintain the actual rotor position approximately equal to the commanded rotor position.

9. An electromechanical energy conversion system according to claim 8 further comprising means for initially acquiring the position of said rotor.

10. An electromechanical energy conversion system according to claims 8 or 9 wherein said means for measuring the rotor position comprises:
    means for predicting a future rotor position; and
    means for comparing the present rotor position with said future rotor position and for producing a signal when the present rotor position reaches the future rotor position.

11. An electromechanical energy conversion system according to claim 8 wherein said sensors comprise Hall devices and wherein the present rotor position is indicated by quasilinear voltages produced by said Hall devices.

12. An electromechanical energy conversion system according to claim 10 further comprising:
    means for producing a sector change signal when a rotor pole moves from one sector to another;
    means responsive to said sector change signal for providing a signal indicative of rotor velocity; and
    means for scaling the predicted rotor positions so that at low speeds the position increments are relatively small and at high speeds the position increments are relatively large.

13. An electromechanical energy conversion system comprising:
    a brushless motor having a rotor and a stator having a plurality of energizeable windings;
    sensors associated with said motor for sensing the relative position of said rotor and stator and for producing electrical signals indicative thereof;
    switching circuitry connected to said windings for controlling the flow of current therethrough;
    power measuring means for producing an electrical signal indicative of the power delivered by said motor; and
    control means connected to said sensors, said switching circuitry and said power measuring means, said control means comprising a current modulator for producing a current command signal having a variable duty cycle, and a logic array for controlling said switching circuitry so as to maximize the power delivered by said motor.

14. An electromechanical energy conversion system according to claim 13 wherein said power measuring means produces a signal indicative of rotor velocity and said logic array controls said switching circuitry so as to maximize rotor velocity.

15. A method for controlling the conversion of energy by an electromechanical system employing a brushless motor having a rotor and a stator having a plurality of energizeable windings, comprising the steps of:

sensing the relative position of said rotor and stator;
producing a sector signal indicative of a sector in which a rotor pole is located;
energizing said windings in accordance with said sector signal;
sensing the current flowing through said windings;
producing a sector change signal when a rotor pole moves from one sector to another;
measuring the rotor velocity;
comparing said measured rotor velocity with a commanded rotor velocity; and
modulating the flow of current through said windings by energizing windings when winding currents fall below a first value and deenergizing windings when winding currents exceed a second value so as to maintain said measured velocity approximately equal to said commanded velocity.

16. A method according to claim 15 wherein said step of measuring the rotor velocity comprises the step of counting sector change signals over a predetermined period of time.

17. A method according to claim 15 wherein said step of measuring the rotor velocity comprises the step of counting clock pulses occurring between sector change signals.

18. A method according to claim 15 further including the step of producing a torque command signal for controlling the direction of rotor rotation.

19. A method for controlling the conversion of energy by an electromechanical system employing a brushless motor having a rotor and a stator having a plurality of windings, comprising the steps of:
sensing the relative position of said rotor and stator;
producing a sector signal indicative of a sector in which a rotor pole is located;
energizing said windings in accordance with said sector signal;
sensing the current flowing through said windings;
measuring the rotor position;
comparing said measured rotor position with a commanded rotor position; and
modulating the flow of current through said windings by energizing windings when winding currents fall below a first value and deenergizing windings when winding currents exceed a second value so as to maintain said measured position approximately equal to said commanded position.

20. A method for controlling the conversion of energy by an electromechanical system employing a brushless motor having a rotor and a stator having a plurality of windings, comprising the steps of:
sensing the relative position of said rotor and stator;
producing a sector signal indicative of a sector in which a rotor pole is located;
energizing said windings in accordance with said sector signal;
sensing the current flowing through said windings;
producing a sector change signal when a rotor pole moves from one sector to another;
measuring the rotor velocity;
measuring the rotor position;
comparing said measured velocity with a commanded velocity;
comparing said measured position with a commanded position; and
modulating the flow of current through said windings by energizing windings when winding currents fall below a first value and deenergizing windings when winding currents exceed a second value so as to initially maintain said measured rotor velocity approximately equal to said commanded rotor velocity and tc subsequently maintain said measured rotor position approximately equal to said commanded rotor position.

21. A method according to claim 20 further including the step of producing a torque command signal for controlling the direction of rotor rotation.

22. A method for controlling the conversion of energy by an electromechanical system employing a brushless motor having a rotor and a stator having a plurality of windings comprising the steps of:
sensing the relative position of said rotor and stator;
energizing said windings by switching the voltage applied thereto;
producing an indication of the power delivered by said motor; and
varying the duty cycle of said switching so as to maximize said indication of motor power.

23. A method according to claim 22 wherein said step of producing an indication of the power delivered by said motor comprises the step of measuring the rotor velocity.

* * * * *